(12) United States Patent
Endo et al.

(10) Patent No.: US 10,067,287 B2
(45) Date of Patent: Sep. 4, 2018

(54) OPTICAL FIBER AND METHOD OF MANUFACTURING THE SAME

(71) Applicant: Fujikura Ltd., Tokyo (JP)

(72) Inventors: Sho Endo, Sakura (JP); Tatsuya Kishi, Sakura (JP); Takayuki Kitamura, Sakura (JP)

(73) Assignee: FUJIKURA LTD., Tokyo (JP)

(*) Notice: Subject to any disclaimer, the term of this patent is extended or adjusted under 35 U.S.C. 154(b) by 0 days.

(21) Appl. No.: 15/514,090

(22) PCT Filed: Sep. 24, 2015

(86) PCT No.: PCT/JP2015/076899
§ 371 (c)(1),
(2) Date: Mar. 24, 2017

(87) PCT Pub. No.: WO2016/047675
PCT Pub. Date: Mar. 31, 2016

(65) Prior Publication Data
US 2017/0336558 A1  Nov. 23, 2017

(30) Foreign Application Priority Data

Sep. 26, 2014 (JP) .................. 2014-195937
Sep. 26, 2014 (JP) .................. 2014-195938
Dec. 10, 2014 (JP) .................. 2014-249846

(51) Int. Cl.
*G02B 6/028* (2006.01)
*G02B 6/036* (2006.01)
*G02B 6/02* (2006.01)

(52) U.S. Cl.
CPC ....... *G02B 6/02009* (2013.01); *G02B 6/0365* (2013.01); *G02B 6/03627* (2013.01); *G02B 6/03633* (2013.01)

(58) Field of Classification Search
None
See application file for complete search history.

(56) References Cited

U.S. PATENT DOCUMENTS

| 5,504,829 A | 4/1996 | Evans et al. |
| 6,386,001 B1 | 5/2002 | Shimizu et al. |

(Continued)

FOREIGN PATENT DOCUMENTS

| CN | 1400478 A | 3/2003 |
| CN | 102043195 A | 5/2011 |

(Continued)

OTHER PUBLICATIONS

Okamoto et al., "Computer-Aided Synthesis of the Optimum Refractive-Index Profile for a Multimode Fiber", IEEE Transactions on Microwave Theory and Techniques, Mar. 1977, vol. MTT-25, No. 3, pp. 213-221 (9 pages).

(Continued)

*Primary Examiner* — Jerry Rahill
(74) *Attorney, Agent, or Firm* — Westerman, Hattori, Daniels & Adrian, LLP

(57) ABSTRACT

An optical fiber includes a core and a cladding surrounding an outer periphery of the core and has a refractive index profile in which a relative refractive index difference with respect to a distance r from a center of the core is represented by Δ(r), where a value of A represented by $$A = -\int_0^{0.22 MFD_{1.31}} (\Delta(r) - \Delta_{ref}(r)) dr + \int_{0.22 MFD_{1.31}}^{0.44 MFD_{1.31}} (\Delta(r) - \Delta_{ref}(r)) dr \quad \text{(Formula 1)}$$

is 0.3%·μm or less, where a unit of r is μm, a unit of a relative refractive index difference Δ(r) is %, $\Delta_{ref}(r) = -0.064r + 0.494$, and $MFD_{1.31}$ is a mode field diameter at a wavelength of 1.31 μm.

9 Claims, 13 Drawing Sheets

(56) References Cited

U.S. PATENT DOCUMENTS

| | | |
|---|---|---|
| 6,449,416 B1 | 9/2002 | Lee et al. |
| 6,882,788 B2 | 4/2005 | Van Bergen et al. |
| 6,999,667 B2 | 2/2006 | Jang et al. |
| 7,003,205 B2 | 2/2006 | Cho et al. |
| 7,154,663 B2 | 12/2006 | Lee et al. |
| 7,406,237 B2 | 7/2008 | Bickham et al. |
| 7,689,085 B1 | 3/2010 | Mishra |
| 7,876,990 B1 | 1/2011 | Mishra |
| 8,428,411 B2 | 4/2013 | de Montmorillon et al. |
| 8,588,569 B2 | 11/2013 | Bookbinder et al. |
| 2003/0063878 A1 | 4/2003 | Matsuo et al. |
| 2006/0045448 A1 | 3/2006 | Nakajima et al. |
| 2006/0093297 A1 | 5/2006 | Sako et al. |
| 2007/0116416 A1 | 5/2007 | Chen et al. |
| 2007/0147751 A1 | 6/2007 | Fini |
| 2013/0044987 A1 | 2/2013 | Bickham et al. |
| 2013/0094824 A1 | 4/2013 | Lee et al. |
| 2014/0328566 A1 | 11/2014 | Bickham et al. |
| 2015/0226914 A1 | 8/2015 | Hirano et al. |

FOREIGN PATENT DOCUMENTS

| | | |
|---|---|---|
| CN | 103380389 A | 10/2013 |
| EP | 0 260 795 A2 | 3/1988 |
| EP | 1 397 718 B1 | 10/2004 |
| EP | 1 777 559 A1 | 4/2007 |
| EP | 1788411 A1 | 5/2007 |
| EP | 1 808 717 A1 | 7/2007 |
| EP | 2894498 A1 | 7/2015 |
| JP | 63-43107 A | 2/1988 |
| JP | 7-209539 A | 8/1995 |
| JP | 2000-205999 A | 7/2000 |
| JP | 2000-264661 A | 9/2000 |
| JP | 2006-133496 A | 5/2006 |
| JP | 2006/293166 A | 10/2006 |
| JP | 2008-547049 A | 12/2008 |
| JP | 4268115 B2 | 5/2009 |
| JP | 2009-543126 A | 12/2009 |
| JP | 2010-501894 A | 1/2010 |
| JP | 4417286 B2 | 2/2010 |
| JP | 2012-516473 A | 7/2012 |
| JP | 2013-512463 A | 4/2013 |
| JP | 2013-88818 A | 5/2013 |
| JP | 2013-520711 A | 6/2013 |
| JP | 2014-67020 A | 4/2014 |
| WO | 2004/092793 A1 | 10/2004 |
| WO | 2005/106544 A1 | 11/2005 |
| WO | 2006/016572 A1 | 2/2006 |
| WO | 2006/049279 A1 | 5/2006 |
| WO | 2006/118362 A1 | 11/2006 |
| WO | 2007/053198 A2 | 5/2007 |
| WO | 2008/005233 A2 | 1/2008 |
| WO | 2008/024255 A2 | 2/2008 |
| WO | 2010/088482 A1 | 8/2010 |
| WO | 2011/066061 A2 | 6/2011 |
| WO | 2011/106293 A1 | 9/2011 |

OTHER PUBLICATIONS

"Characteristics of a single-mode optical fibre and cable", Telecommunication Standardization Sector of ITU, Nov. 2009, G.652 (22 pages).

"Characteristics of a bending-loss insensitive single-mode optical fibre and cable for the access network", Telecommunication Standardization Sector of ITU, Oct. 2010, G.657 (24 pages).

"Definition and test methods for the relevant parameters of single-mode fibres", Telecommunication Standardization Sector of ITU, Apr. 1997, G.650 (101 pages).

JP Office Action dated Sep. 20, 2016, issued in Japanese Patent Application No. 2016-501467 in Japanese (4 pages).

Non-Final Office Action dated Nov. 23, 2016, issued in U.S. Appl. No. 15/083,957 (10 pages).

JP Office Action dated Feb. 28, 2017, issued in Japanese Patent Application No. 2016-509795 in Japanese (3 pages).

Extended European Search Report dated Mar. 21, 2017, issued in European Patent Application No. 15826791.4 (8 pages).

"Characteristics of a bending-loss insensitive single-mode optical fibre and cable for the access network", Telecommunication Standardization Sector of ITU, Oct. 2012, G.657 (24 pages).

Office Action dated May 26, 2017, issued in Russian Application No. 2016109055, with English translation. (11 pages).

Office Action dated Nov. 7, 2017, issued in counterpart Japanese Application No. 2016-509795 (3 pages).

Notice of Allowance dated May 9, 2017, issued in counterpart Japanese Patent Application No. 2016-501467. (3 pages).

Notice of Allowance dated Jun. 19, 2017, issued in U.S. Appl. No. 15/467,264 (12 pages).

Notice of Allowance dated Sep. 14, 2017, issued in counterpart Russian Application No. 2016109055. (11 pages).

Office Action dated Feb. 7, 2018, issued in counterpart Chinese Application No. 201580001948.1 (6 pages).

Notice of Allowance dated Feb. 6, 2018, issued in Japanese Application No. 2016-509795. (3 pages).

Office Action dated Feb. 6, 2018, issued in Japanese Application No. 2016-550352. (4 pages).

Extended European search report dated Apr. 16, 2018, issued in counterpart EP Application No. 15843671.7.

Extended (supplementary) European Search Report dated May 29, 2018, issued in counterpart European Application No. 15844942.1. (7 pages).

OPTICAL FIBER AND METHOD OF MANUFACTURING THE SAME

TECHNICAL FIELD

The present invention relates to an optical fiber having low bending loss and a manufacturing method of the same.

Priority is claimed on Japanese Patent Application No. 2014-195937, filed Sep. 26, 2014, Japanese Patent Application No. 2014-195938, filed Sep. 26, 2014, and Japanese Patent Application No. 2014-249846, filed Dec. 10, 2014, the contents of which are incorporated herein by reference.

BACKGROUND ART

An optical fiber having low bending loss (low bending loss optical fiber) is, in particular, needed for Fiber To The Home (FTTH) introducing an optical fiber to offices, homes, and the like. When drawing around the optical fiber inside of buildings and houses, for example, there is a possibility that a small bend is introduced to the optical fiber. A portion remaining after the drawing (extra portion) is stored by winding in a predetermined radius or more. By slightly bending the extra portion, the storage space can be reduced. Therefore, an optical fiber with a reduced so-called bending loss (macro bend loss) where the loss does not increase even when a small bend is introduced is important. In the optical fiber for home wiring, since the connection loss of the optical fiber connecting the base station and the home of user is small, the cost is required to be low. As an optical fiber connecting the base station and the home of user, since a distance is long, a general-purpose single-mode (SM) fiber is used.

ITU-T Recommendation G.657 is used as the standard of an optical fiber in which the bending loss is reduced compared to a standard single mode optical fiber (SSMF) while being based on ITU-T Recommendation G.652 which is the standard of the standard single mode optical fiber (SSMF).

Previously, in order to obtain a low bending loss optical fiber, for example, to reduce the mode field diameter (MFD) (e.g. see Patent Documents 1 and 2, and Non-Patent Document 1), a trench around the core (the low refractive index portion) and provided (see, for example Patent documents 3-5), the refractive index profile α-th power profile of the core and (graded-index) (see, for example Patent documents 4 and 6) have been proposed.

PRIOR ART DOCUMENTS

Patent Documents

[Patent Document 1] Japanese Patent No. 4268115
[Patent Document 2] PCT International Publication No. WO2006/016572
[Patent Document 3] Japanese Unexamined Patent Application, First Publication No. 2013-88818
[Patent Document 4] U.S. Pat. No. 8,428,411
[Patent Document 5] Japanese Unexamined Patent Application, First Publication No. S63-43107
[Patent Document 6] U.S. Pat. No. 8,588,569

Non-Patent Documents

[Non-Patent Document 1] K. Okamoto and T. Okoshi, "Computer-aided synthesis of the optimum refractive index profile for a multimode fiber," IEEE Trans. Microwave Theory Tech., vol. MTT-25, pp. 213-221, 1976

DISCLOSURE OF INVENTION

Problems to be Solved by the Invention

As shown in FIG. 2 of Patent Document 1, when the MFD is reduced, a connection loss of an optical fiber with the general-purpose SM fiber is increased. For this reason, the MFD of the optical fiber is preferable to be the same as that of the general-purpose SM fiber (approximately 9.2 μm at a wavelength of 1.31 μm).

If the trench is provided around the core, without reducing the MFD, a low bending loss can be realized. However, when manufacturing the trench by an outside vapor deposition (OVD) method or a jacket of a glass with a low refractive index (e.g., quartz tube) and the like, the manufacturing process of the optical fiber increases. It is possible to manufacture from a core portion to a trench portion by the same inside vapor deposition (i.e., CVD) method; however, a size of a preform which can be manufactured is small, and an optical fiber which can be manufactured by drawing from one preform is short. As a result, the manufacturing cost increases in either way.

From the above descriptions, it is desired that an optical fiber having a low bending loss has a refractive index profile with a single peak formed of a core and a cladding while maintaining the MFD equivalent to the MFD of a general-purpose optical fiber. Conventionally, it is known that when a refractive index profile of a core is an α-index profile, a bending loss decreases. Therefore, an optical fiber having a core refractive index profile in which the bending loss is lower than when having an α-index profile is required. In addition, even when a trench is provided around the core, an optical fiber having a core refractive index profile in which the bending loss is lower than when having an α-index profile is required.

The present invention has been made in view of the above circumstances and provides an optical fiber having a core refractive index profile in which the bending loss is lower than when having an α-index profile and a method of manufacturing the same.

Means for Solving the Problems

A first aspect of the present invention is an optical fiber including a core and a cladding surrounding an outer periphery of the core and having a refractive index profile in which a relative refractive index difference with respect to a distance r from a center of the core is represented by Δ(r), where a value A represented by $$A = -\int_0^{0.22 MFD_{1.31}} (\Delta(r) - \Delta_{ref}(r)) dr + \int_{0.22 MFD_{1.31}}^{0.44 MFD_{1.31}} (\Delta(r) - \Delta_{ref}(r)) dr \quad \text{(Formula 1)}$$

is 0.3%·μm or less.

Here, the unit of r is μm, the unit of the relative refractive index difference Δ(r) is %, and $\Delta_{ref}(r) = -0.064r + 0.494$, and $MFD_{1.31}$ is a mode field diameter at a wavelength of 1.31 μm.

A second aspect of the present invention is the optical fiber according to the first aspect, in which the mode field diameter $MFD_{1.31}$ at the wavelength of 1.31 μm is preferably 8.93 μm or more and 9.4 μm or less.

A third aspect of the present invention is the optical fiber according to the first or second aspect, in which a maximum relative refractive index difference Δmax throughout the core and a maximum relative refractive index difference $\Delta_C$ within a range where a distance r from a center of the core is 1 μm or less are preferably the same.

A fourth aspect of the present invention is the optical fiber according to any one of the first to third aspects, in which a maximum relative refractive index difference Δmax throughout the core is 0.39% or more.

A fifth aspect of the present invention is the optical fiber according to any one of the first to fourth aspects, in which a maximum relative refractive index difference Δmax throughout the core is 0.50% or less.

A sixth aspect of the present invention is the optical fiber according to any one of the first to fifth aspects, in which a cable cut-off wavelength λcc is 1260 nm or less.

A seventh aspect of the present invention is the optical fiber according to any one of the first to sixth aspects, in which a cable cut-off wavelength λcc is 1170 nm or less.

A eighth aspect of the present invention is the optical fiber according to any one of the first to seventh aspects, in which a MAC value represented by a ratio $MFD_{1.31}/\lambda cc$ of a mode field diameter $MFD_{1.31}$ at a wavelength of 1.31 μm and a cable cut-off wavelength Δcc is 7.38 or more and 7.7 or less.

A ninth aspect of the present invention is a method of manufacturing the optical fiber according to any one of the first to eighth aspects having a refractive index profile in which a relative refractive index difference with respect to a distance r from a center of the core is represented by $\Delta(r)$, the method including, calculating a value A represented by $$A = -\int_0^{0.22MFD_{1.31}} (\Delta(r) - \Delta_{ref}(r))dr + \int_{0.22MFD_{1.31}}^{0.44MFD_{1.31}} (\Delta(r) - \Delta_{ref}(r))dr \quad \text{(Formula 2)}$$

where a unit of r is μm, a unit of a relative refractive index difference $\Delta(r)$ is %, $\Delta_{ref}(r) = -0.064r + 0.494$, and $MFD_{1.31}$ is a mode field diameter at a wavelength of 1.31 μm, and confirming the value A is 0.3%·μm or less.

Effects of the Invention

According to the aspects of the present invention described above, an optical fiber having a greater relative refractive index difference at a position closer to a center of a core so that light is easily confined in the center of the core is obtained, and a loss when the optical fiber is bent can be reduced.

EMBODIMENTS FOR CARRYING OUT THE INVENTION

First Embodiment

Hereinbelow, the first preferred embodiment of the present invention is described.

Figure 1:
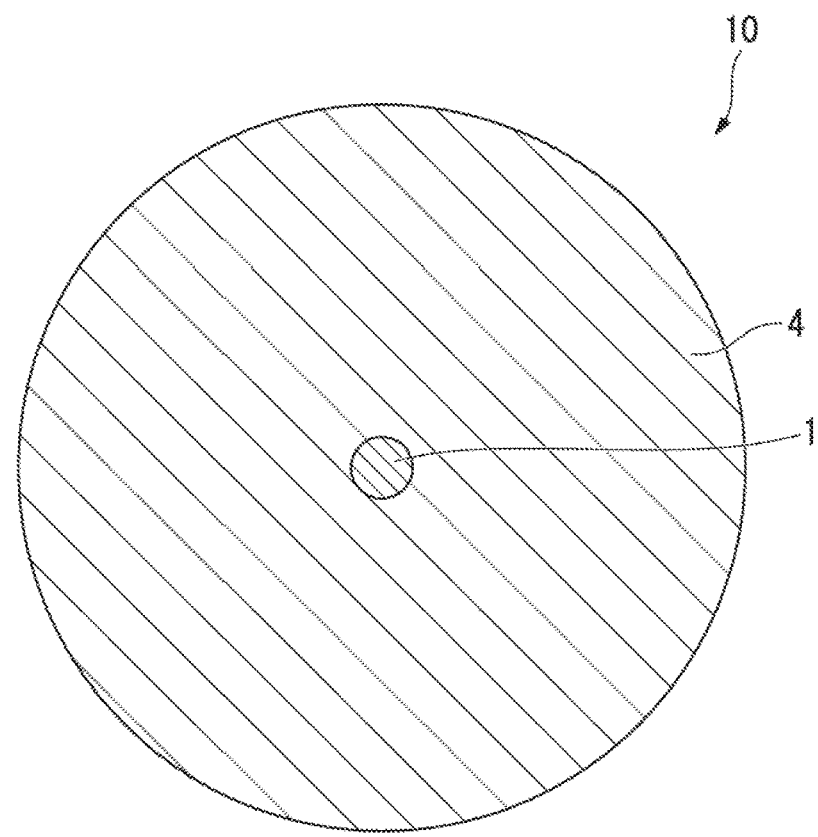
FIG. 1 is a cross-sectional view schematically showing an optical fiber according to the first embodiment of the present invention.
Figure 2:
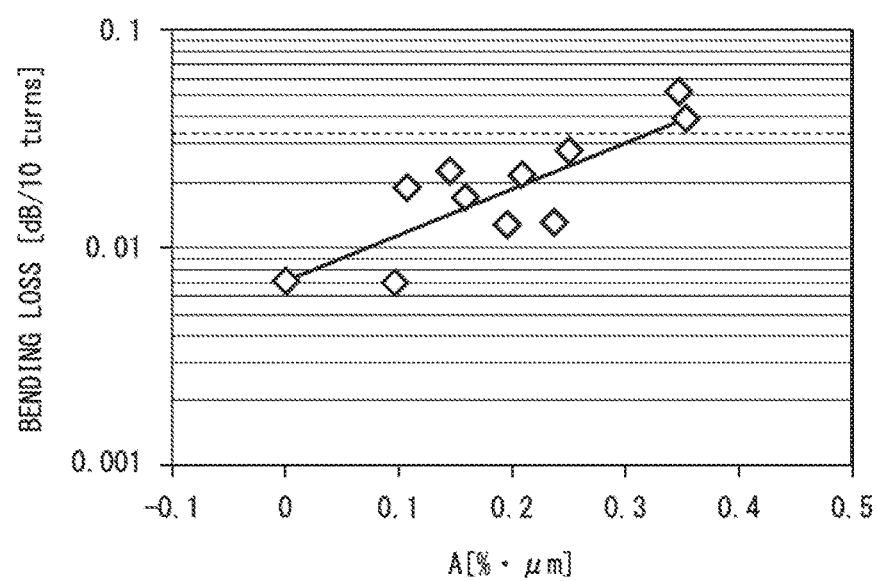
FIG. 2 is a graph showing the relationship between a bending loss and an A value in an example of the first embodiment.
Figure 3:
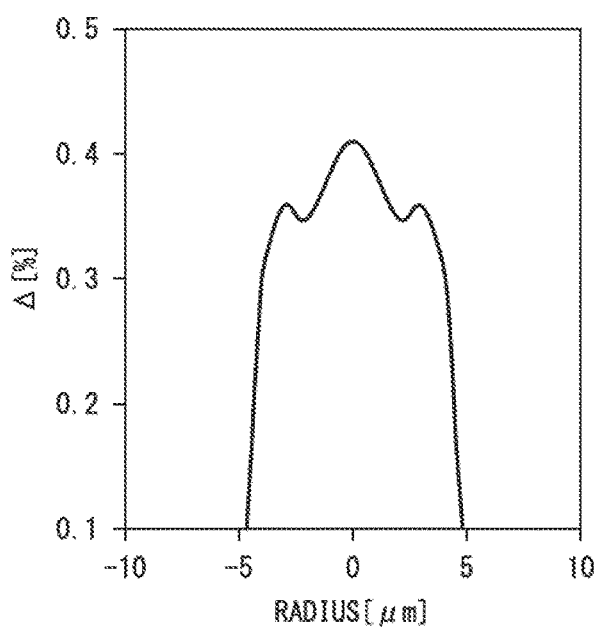
FIG. 3 is a graph showing a refractive index profile of an optical fiber of Example 1.
Figure 4:
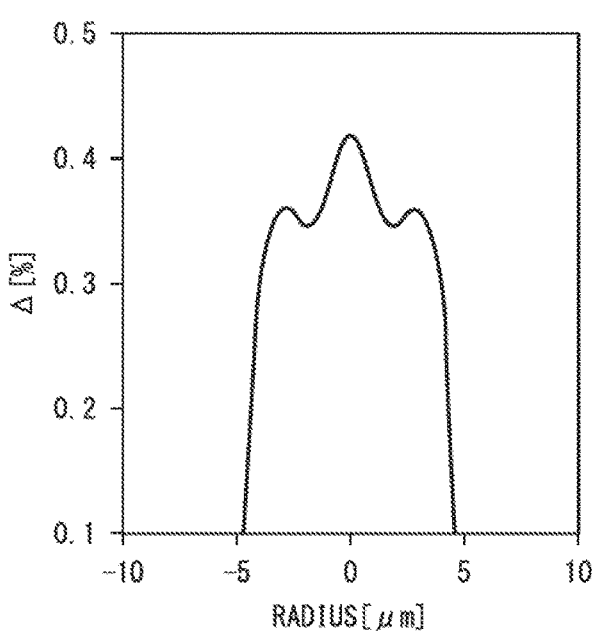
FIG. 4 is a graph showing a refractive index profile of an optical fiber of Example 2.
Figure 5:
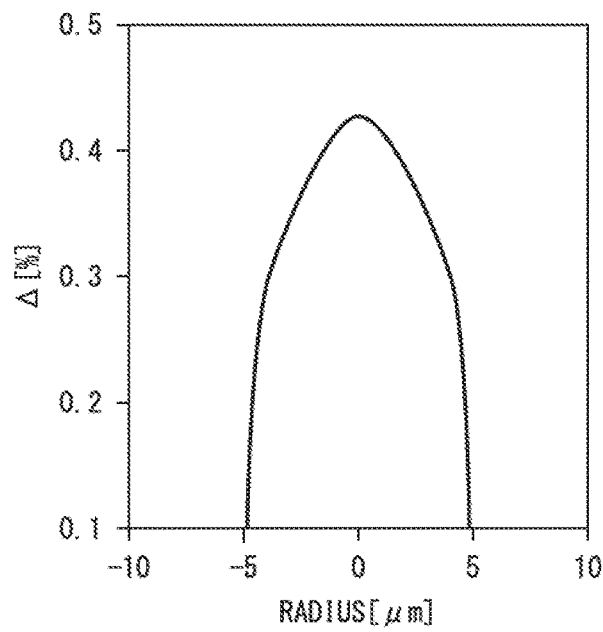
FIG. 5 is a graph showing a refractive index profile of an optical fiber of Example 3.
Figure 6:
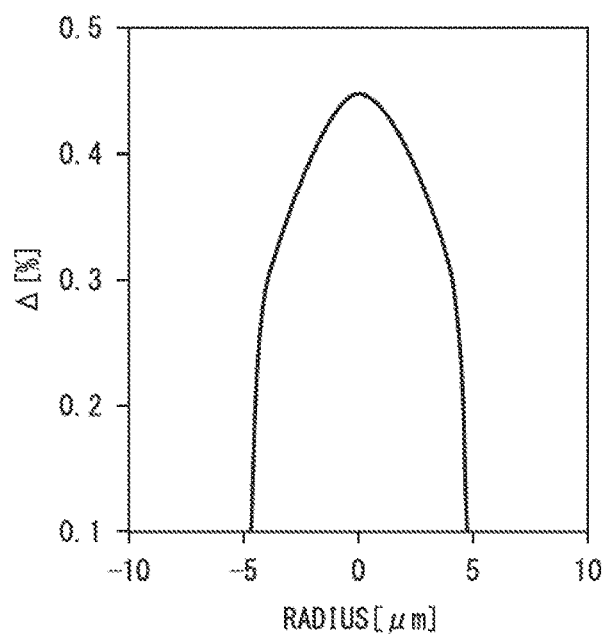
FIG. 6 is a graph showing a refractive index profile of an optical fiber of Example 4.
Figure 7:
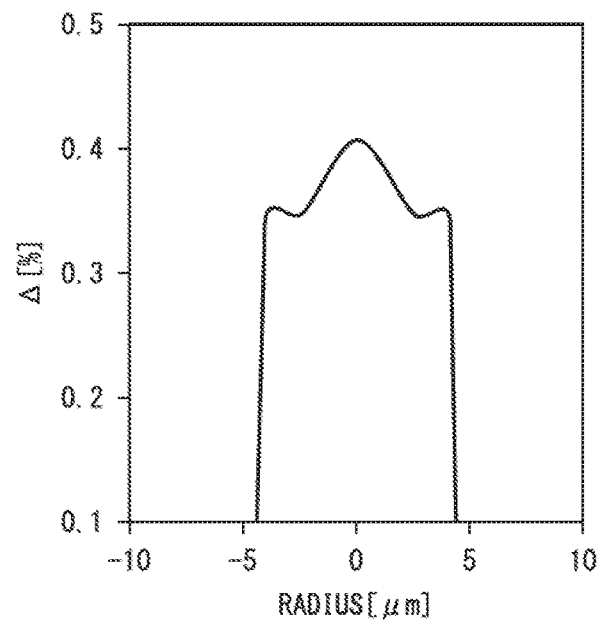
FIG. 7 is a graph showing a refractive index profile of an optical fiber of Example 5.
Figure 8:
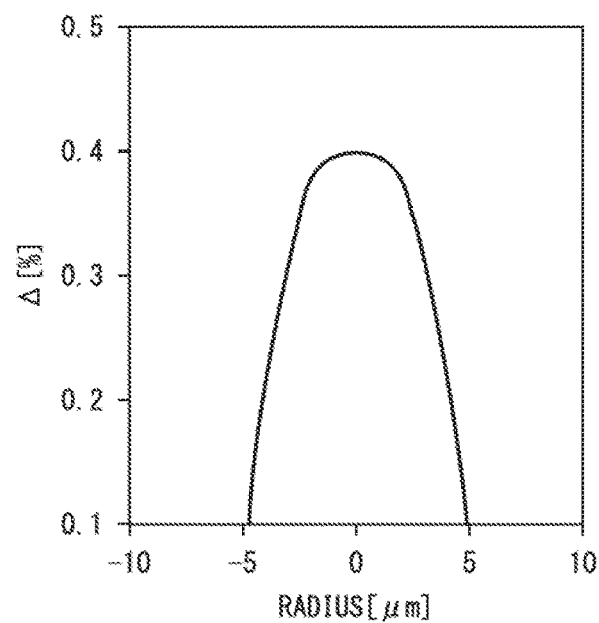
FIG. 8 is a graph showing a refractive index profile of an optical fiber of Example 6.
Figure 9:
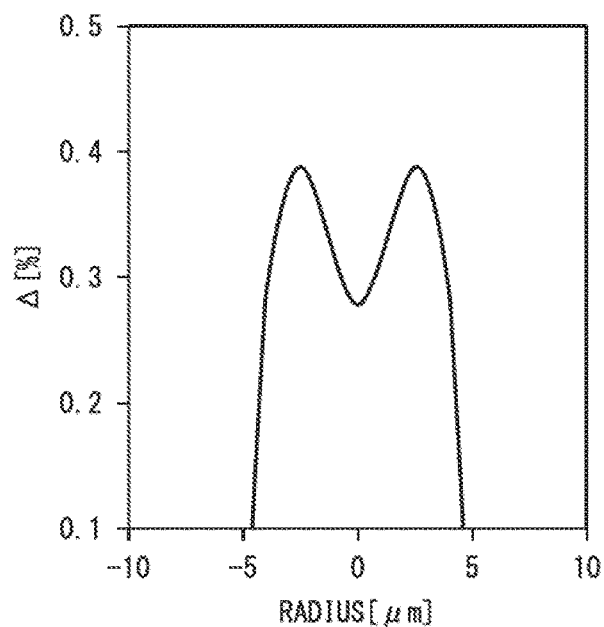
FIG. 9 is a graph showing a refractive index profile of an optical fiber of Example 7.
Figure 10:
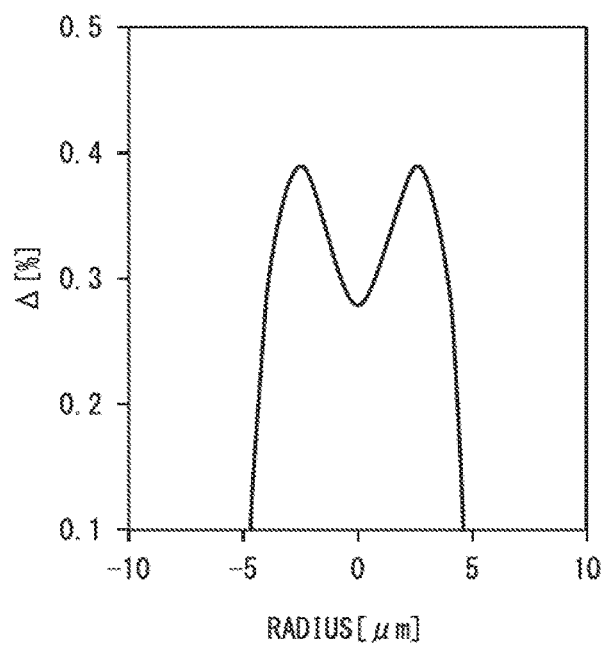
FIG. 10 is a graph showing a refractive index profile of an optical fiber of Example 8.
Figure 11:
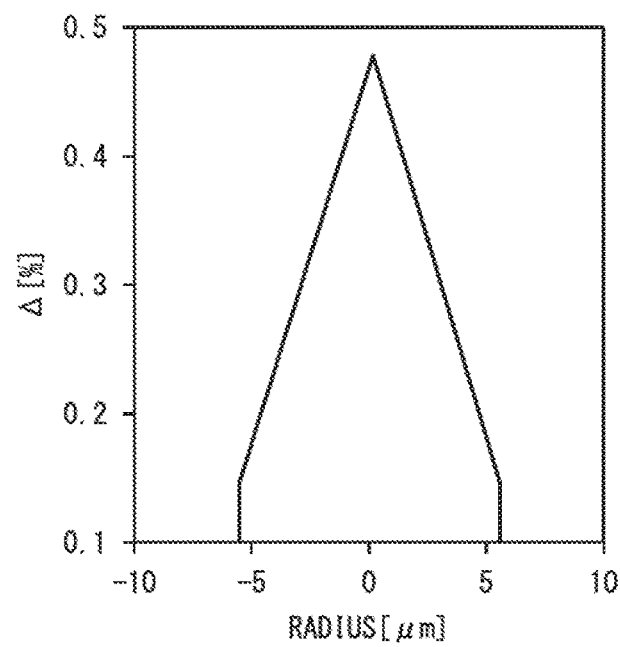
FIG. 11 is a graph showing a refractive index profile of an optical fiber of Example 9.

An optical fiber 5 of the present embodiment includes, as shown in FIG. 1, a core 1 which is provided at a center portion of the optical fiber 5 and a cladding 4 which surrounds an outer periphery of the core 1. Although the cladding 4 is typically cylindrical with respect to the core 1, the core 1 and the cladding 4 may be eccentric within the allowable range.

The refractive index profile of the core is expressed by $\Delta(r)$ as a function of the relative refractive index difference Δ with respect to the distance r from the center of the core. The distance r is a non-negative (r≥0). The relative refractive index difference Δ of the core means a relative refractive index difference on the basis of a relative refractive index difference of the cladding. In the cladding, the relative refractive index difference is 0. In the present embodiment, as a condition for obtaining a low bending loss optical fiber, a range of a value A determined by the following formula (defining formula of A) is identified. Derivation of the definition formula will be described later.

$$A = -\int_0^{0.22MFD_{1.31}} (\Delta(r)-\Delta_{ref}(r))dr + \int_{0.22MFD_{1.31}}^{0.44MFD_{1.31}} (\Delta(r)-\Delta_{ref}(r))dr \quad \text{(Formula 3)}$$

Here, the unit of r is μm and the unit of the relative refractive index difference $\Delta(r)$ is %. $\Delta_{ref}(r)$ is $-0.064r+0.494$. $MFD_{1.31}$ is a mode field diameter at a wavelength of 1.31 μm.

In the SM fiber, the MFD is not necessarily equal to the core diameter (diameter); however, generally, the MFD is approximately equals to the core diameter. Then, since $0.5MFD_{1.31}$ is approximately equal to the core radius, a region of $r \leq 0.44MFD_{1.31}$ represents the most of the core (excluding a peripheral portion). A region of $r \leq 0.22MFD_{1.31}$ represents the center portion of the core.

The definition expression of A described above includes a definite integral (first definite integral) in the interval of $0 \leq r \leq 0.22MFD_{1.31}$ and a definite integral (second definite integral) in the interval of $0.22MFD_{1.31} \leq r \leq 0.44MFD_{1.31}$. In the first definite integral and the second of the definite integral, each width of the integration interval ($0.22MFD_{1.31}$) is equal and the integrant ($\Delta(r)-\Delta_{ref}(r)$) is also equal; however, the signs are opposite and the contribution to A is different. As a result, in the refractive index profile in which the relative refractive index difference becomes higher when closer to the center portion of the core, the value A tends to be decreased.

Therefore, the value A is preferably equal to or less than 0.3%·μm. Thus, an optical fiber in which light is easily confined to the center of the core is obtained and it is possible to reduce the loss when the bent is occurred in the optical fiber. The value A is more preferably 0.2%·μm or less and is further more preferably 0.1%·μm or less.

$\Delta_{ref}(r)$ in the definition formula of A represents a refractive index profile (reference refractive index profile) referred to by the definition formula of A. In the present embodiment. $\Delta_{ref}(r)$ is represented by a linear formula of r. In particular, as described above, $\Delta_{ref}(r)=-0.064r+0.494$. When the refractive index profile of the core is represented by $\Delta(r)=-0.064r+0.494$ as in the reference refractive index profile $\Delta_{ref}(r)$, the integrant ($\Delta(r)-\Delta_{ref}(r)$) in the definition formula of the A is identically 0; therefore, the value A is also 0. The value A may be, for example, 0%·μm or more, $-0.01$%·μm or more, $-0.02$%·μm or more, $-0.03$%·μm or more, $-0.05$%·μm or more, $-0.1$%·μm or more, $-0.2$%·μm or more, $-0.3$%·μm or more, or the like.

The method of manufacturing an optical fiber of the present embodiment includes calculating the value A using the defining formula of A and confirming that the value A is within a predetermined range (e.g., 0.3%·μm or less). The calculation step and the confirming step of A can be carried out at any stage in a series of steps either before or after each step which is carried out during manufacturing an optical fiber such as designing a refractive index profile of the optical fiber, manufacturing an optical fiber preform having the designed refractive index profile, drawing an optical fiber from the fiber preform and the like.

The optical fiber according to the present embodiment is able to be manufactured by preparing an optical fiber preform by a known preform preparation method such as a vapor-phase axial deposition (VAD) method, an outside vapor deposition (OVD) method, and a chemical vapor deposition (CVD) method, and then, by drawing a optical fiber from the optical fiber preform. Examples of the preparation method of the optical fiber preform include a method in which glass configuring at least the core is prepared by an outside vapor deposition method or a chemical vapor deposition method, and a remaining glass portion is further prepared by deposition of silica ($SiO_2$) glass, a jacket of a silica tube, and the like. More specifically, the entire core or the entire core and a portion of the cladding can be manufactured by the VAD method as well as the remaining portion of the cladding can be manufactured by the OVD method.

The size of the optical fiber is not particularly limited, and examples of the diameter of the clad include 125 μm, 80 μm, and the like. In the optical fiber after the drawing, one or two or more layers of coating materials such as a resin may be laminated on the outer circumference of the cladding.

It is often used in the optical fiber connecting the base station and the user's home, in order to suppress the connection loss with respect to the generic SM fiber which is used quite often as an optical fiber connecting the base station and the home of user, it is preferable that the MFD be approximately the same as the MFD of the generic SM fiber. For example, the mode field diameter MFD1.31 at a wavelength of 1.31 μm is preferably around 9.2 μm. Specifically, it is preferable that the MFD1.31 be 9.2 μm±0.2 μm or 8.93 μm or more and 9.4 μm or less.

The refractive index profile of the core is preferably a single peak having only one peak in the range of the core diameter. Here, having a single peak means that a point where the relative refractive index difference of the core is at maximum is only one point within the core diameter. The range of the core diameter includes, as a core center as 0, not only the side where the coordinate value of the radius is positive, but the side where the coordinate value of the radius is negative. If the refractive index profile of the core is concentric shape, the relative refractive index difference in the core center has a maximum value. Therefore, the maximum relative refractive index difference Δmax throughout the core and the maximum relative refractive index difference Δc within the range where the distance r from the center of the core is 1 μm or less are preferably the same.

In order to confine light in the core in the optical fiber, the refractive index of the core may be higher than that of the cladding; however, if the relative refractive index difference is too small, the light confinement is weakened. Therefore, it is preferable that the maximum relative refractive index difference Δmax throughout the core be greater than 0.39%. On the contrary, the required amount of dopants is increased and the cost increased when the relative refractive index difference is too large. Therefore, it is preferable that the maximum relative refractive index difference Δmax throughout the core be less than 0.50%.

When the optical fiber is less influenced by the bending loss, the cut-off wavelength is shortened that is a lower limit of the wavelength range in which the single mode propagation is performed in the optical fiber, and the wavelength range of the single mode propagation is expanded. Therefore, a cut-off wavelength λcc (i.e., a cut-off wavelength $\lambda c_{22m}$, of 22 m) of the optical fiber is preferably 1260 nm or less. λcc may be 1170 nm or more. Furthermore, it is preferable that a MAC value represented by the ratio $MFD_{1.31}/\lambda cc$ of the mode field diameter $MFD_{1.31}$ at a wavelength of 1.31 μm and a cable cut-off wavelength λcc be 7.38 or more and 7.7 or less.

While the present invention has been described on the basis of the preferred embodiment above, the present invention is not limited to the above-mentioned embodiment but various modifications may be made without departing from the scope of the present invention.

Examples of a dopant used for manufacturing a silica-based optical fiber include germanium (Ge), phosphorus (P), fluorine (F), boron (B), aluminum (Al), and the like. Two or more types of dopants may be used for manufacturing the silica-based optical fiber. In an example of the composition of the core and the cladding, a core material includes Ge added silica, and a cladding material includes pure silica.

As described above, the first embodiment of the present invention has been described; however, the first embodiment is an example of the present invention, and addition, omission, substitution, and other changes are able to be performed without departing from the scope of the present invention.

EXAMPLES

Hereinafter, detailed explanations of the present invention will be described with reference to the examples.
(Derivation of Definition Formula)

Figure 12:
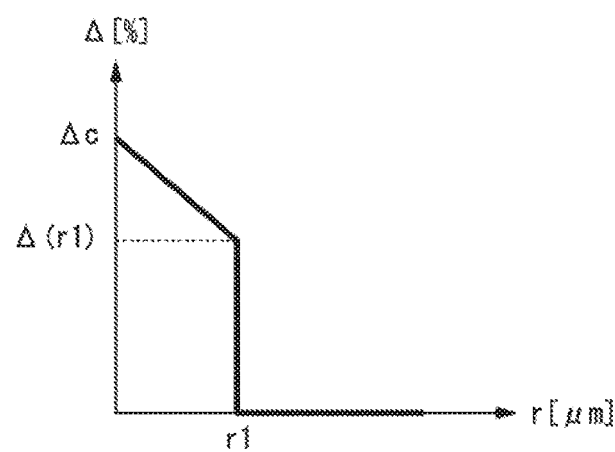
FIG. 12 is a drawing schematically showing a refractive index profile of the optical fiber according to the first embodiment of the present invention.

First, in order to confirm the relationship between the core shape and the bending loss, although the core shape was different, a simulation was performed regarding a refractive index profile in which the cable cutoff wavelength was $\lambda cc$ and the MFD of the wavelength of 1.31 µm was constant. Characteristics were adjusted using the core diameter r1, the relative refractive index difference $\Delta_C$ of the center core portion, and the relative refractive index difference $\Delta(r1)$ where the core diameter is r1 as variables (FIG. 12).

Figure 13A:
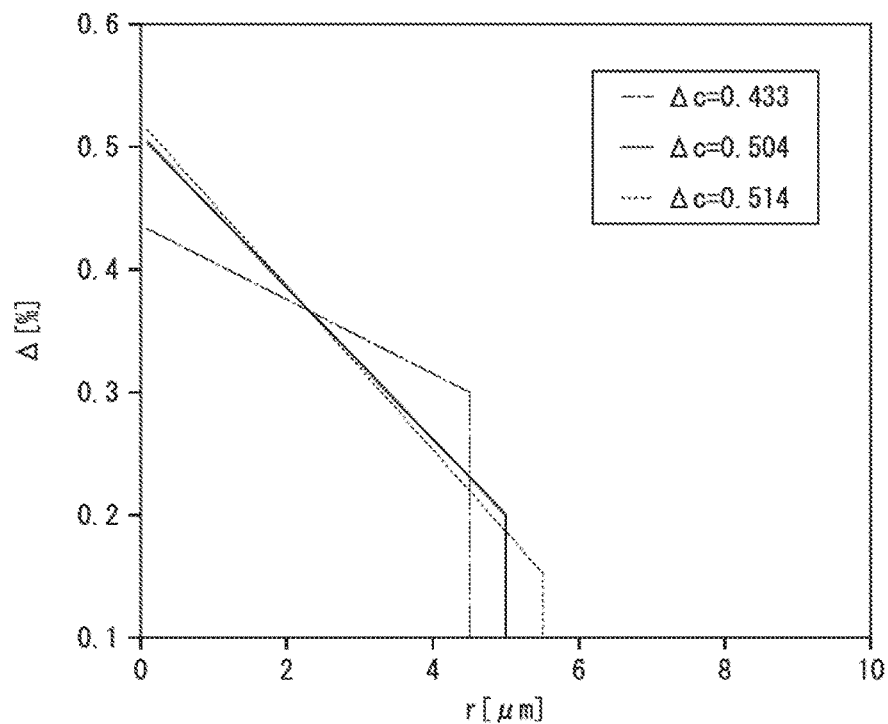
FIG. 13A is a drawing schematically showing a refractive index profile used in a simulation.
Figure 13B:
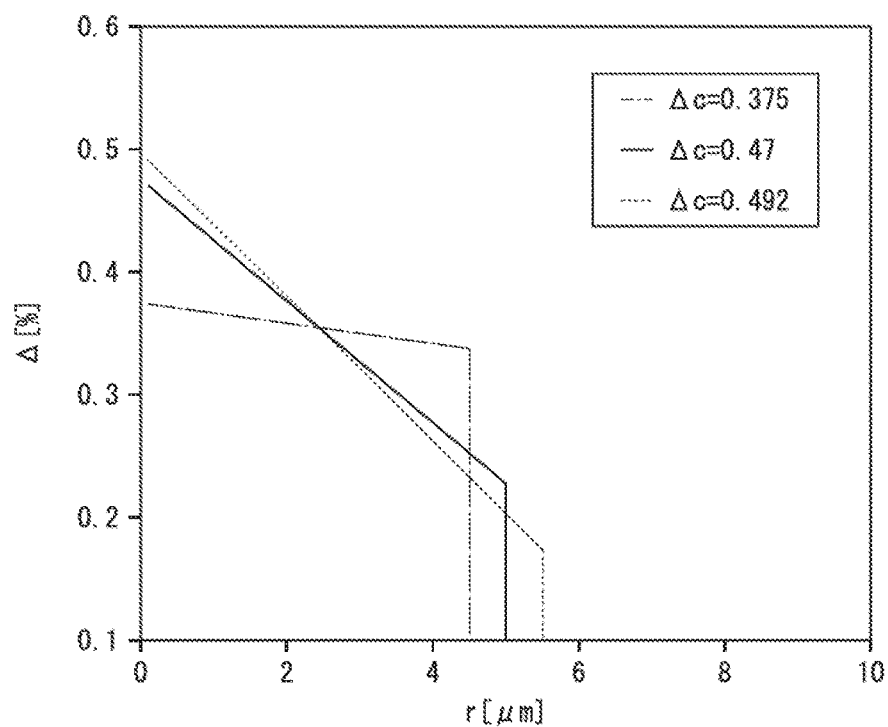
FIG. 13B is a drawing schematically showing a refractive index profile used in a simulation.
Figure 13C:
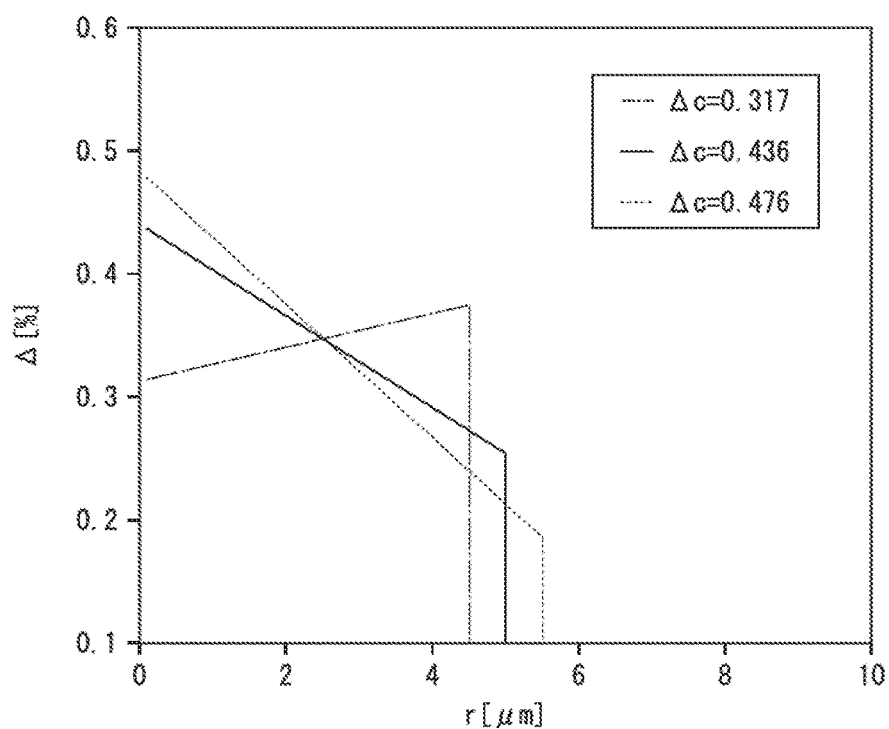
FIG. 13C is a drawing schematically showing a refractive index profile used in a simulation.

The used refractive index profiles are shown in FIGS. 13A-13C. In FIGS. 13A-13C, $\lambda cc$ µm/MFD µm is 1.20/9.00, 1.23/9.15, and 1.26/9.3, respectively. In addition, in order for a variance value to comply with ITU-T Recommendation G.652, depending on the refractive index profile, the variance value is adjusted by providing some low refractive index portions (depressed portions) in the cladding.

Figure 14A:
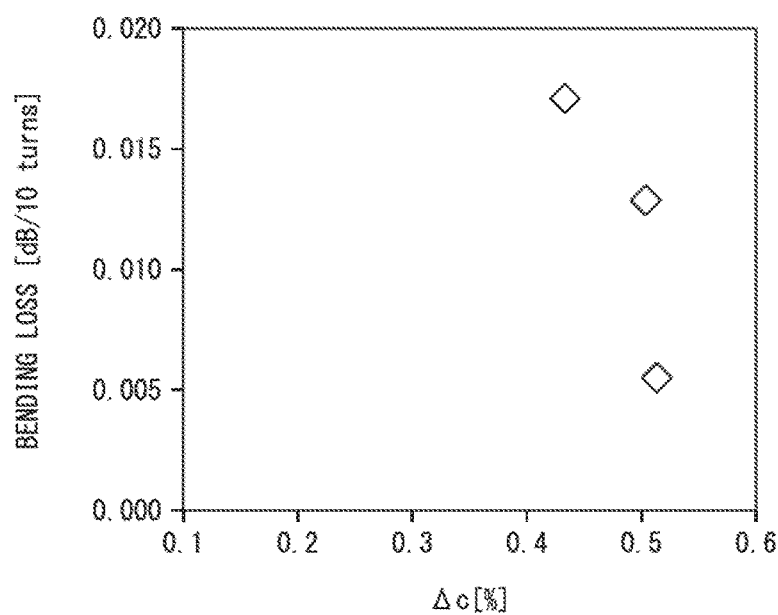
FIG. 14A is a drawing showing a calculation result of a bending loss.
Figure 14B:
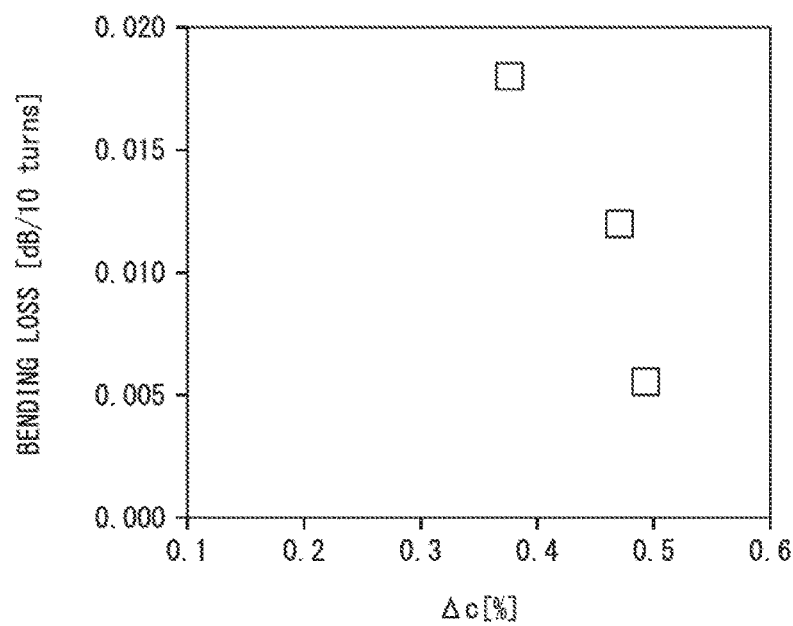
FIG. 14B is a drawing showing a calculation result of a bending loss.
Figure 14C:
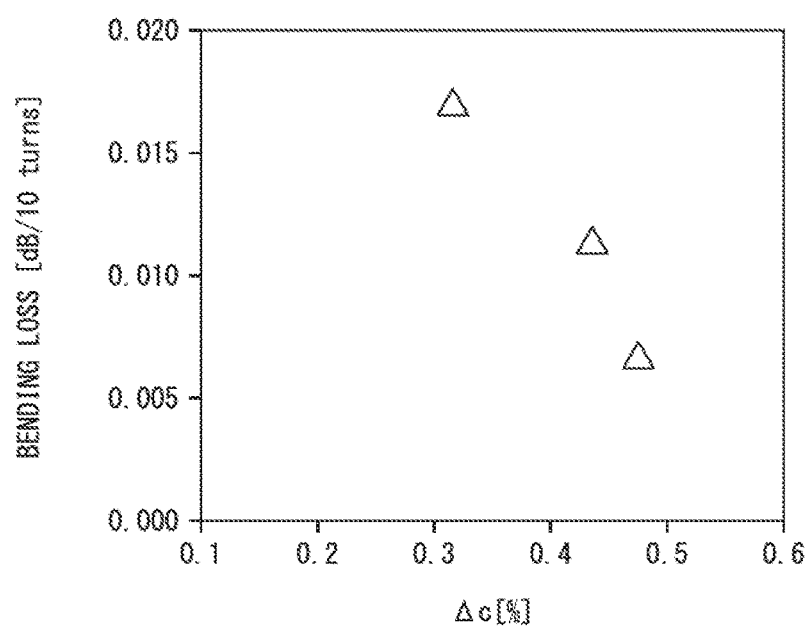
FIG. 14C is a drawing showing a calculation result of a bending loss.

The calculation results of the bending loss of these refractive index profiles are shown in FIGS. 14A-14C. Based on the results, it can be seen that as greater the relative refractive index difference of the center core portion becomes (or as smaller the inclination of the core shape $\Delta(r1)/\Delta c$ becomes), the smaller the bending loss becomes.

However, the deviation occurs in the actual profile, and it is difficult to represent the bending loss using a relative refractive index difference of the center core portion or the inclination. Accordingly, it has been found that based on the deviation from the refractive index profile (reference refractive index profile) where the bending loss is the minimum in the simulation, the relationship with the bending loss is represented. In the standard refractive index profile, by using r1=5.45 µm, $\Delta c$=0.494%, $\Delta(r1)$=0.145%, and $\Delta(r)$=0.064r+ 0.494 (r≤5.45), the deviation is expressed as described below.

$$A = -\int_0^{0.22MFD_{1.31}} (\Delta(r) - \Delta_{ref}(r))dr + \int_{0.22MFD_{1.31}}^{0.44MFD_{1.31}} (\Delta(r) - \Delta_{ref}(r))dr \quad \text{(Formula 4)}$$

(Here, the unit of r is µm, the unit of the relative refractive index difference $\Delta(r)$ is %, and $\Delta_{ref}(r)$=−0.064r+0.494, and $MFD_{1.31}$ is a mode field diameter at a wavelength of 1.31 µm.)

Figure 15:
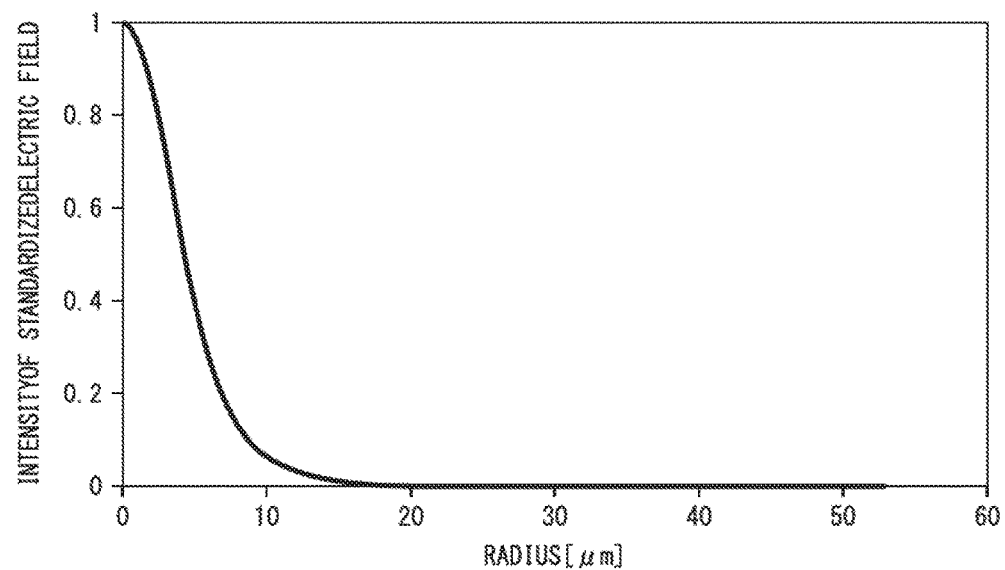
FIG. 15 is a drawing showing a standardized electric field profile in a reference refractive index profile.

A normalized electric field intensity profile in the reference refractive index profile is shown in FIG. 15. A radius at which the normalized electric field intensity is 0.5 is 4 µm at a location of approximately 0.44×MFD=β. It is considered that the confinement of light in the core center affects the bending loss; thus, the deviation is represented by a shape of an inner side of β. Also within this range, an inner peripheral portion (0<r<α=/12) and an outer peripheral portion (α=β/12<r<β) is weighted.
(Manufacturing Optical Fiber)

An optical fiber including a core portion and a cladding layer provided around the core portion was manufactured. The optical fiber was manufactured by fiber drawing (drawing) an optical fiber preform. The optical fiber preform was manufactured in such a manner that after manufacturing a core member made of the entire core and a portion of the cladding with the VAD method or the CVD method, the remaining cladding layer was formed around the core member with the OVD method. In Examples 1-8, the core preform was manufactured with the VAD method, and in Example 9, the core preform was manufactured with the CVD method.

The obtained refractive index profile of the optical fiber is represented by the relative refractive index difference $\Delta$ with respect to the radius (µm). The shape of the refractive index profile of the optical fiber of Examples 1-9 are shown in FIGS. 3-11. In the graphs, regarding the radius (µm), the core center is 0 (µm) and the radius can have a positive or negative value. The distance r (µm) from the core center in the definition formula of A is an absolute value of the radius (µm), and is 0 or a positive value.

Table 1 shows each parameter of the optical fiber of Examples 1-9.

TABLE I

| | $\Delta_{max}$ [%] | $\Delta_c$ [%] | $r_1$ [µm] | $\Delta_{min}$ [%] | A [% · µm] | $\lambda_{CC}$ [µm] | $MFD_{1.31}$ [µm] | MAC | BENDING LOSS [dB/10 turns] |
|---|---|---|---|---|---|---|---|---|---|
| EXAMPLE 1 | 0.41 | 0.41 | 4.5 | −0.01 | 0.16 | 1.24 | 9.26 | 7.47 | 0.017 |
| EXAMPLE 2 | 0.42 | 0.42 | 4.4 | −0.04 | 0.15 | 1.17 | 8.94 | 7.64 | 0.023 |
| EXAMPLE 3 | 0.43 | 0.43 | 4.7 | −0.02 | 0.10 | 1.25 | 9.28 | 7.42 | 0.007 |
| EXAMPLE 4 | 0.45 | 0.45 | 4.6 | −0.04 | 0.11 | 1.22 | 9.20 | 7.54 | 0.019 |
| EXAMPLE 5 | 0.41 | 0.41 | 4.2 | 0 | 0.20 | 1.23 | 9.16 | 7.45 | 0.013 |
| EXAMPLE 6 | 0.40 | 0.40 | 4.5 | −0.01 | 0.21 | 1.21 | 9.11 | 7.53 | 0.022 |
| EXAMPLE 7 | 0.39 | 0.28 | 4.4 | −0.01 | 0.35 | 1.22 | 9.20 | 7.54 | 0.053 |
| EXAMPLE 8 | 0.39 | 0.28 | 4.5 | −0.01 | 0.36 | 1.23 | 9.24 | 7.51 | 0.040 |

TABLE I-continued

|  | $\Delta_{max}$ [%] | $\Delta_c$ [%] | $r_1$ [μm] | $\Delta_{min}$ [%] | A [%·μm] | $\lambda_{CC}$ [μm] | $MFD_{1.31}$ [μm] | MAC | BENDING LOSS [dB/10 turns] |
|---|---|---|---|---|---|---|---|---|---|
| EXAMPLE 9 | 0.49 | 0.49 | 5.5 | 0 | 0.00 | 1.23 | 9.17 | 7.46 | 0.007 |

Δmax is a maximum relative refractive index difference (%) in the entire core. Δc is a maximum relative refractive index difference (%) within the range in which the distance r from the center core is 1 μm or less (i.e., −1 μm≤radius≤1 μm). $r_1$ is the radius of the core (μm). A region in which a distance r from the core center is greater than the core radius r1 is the cladding. In the cladding, the relative refractive index difference is 0. Δmin is a minimum relative refractive index difference (%) in the entire core.

λcc is a cable cut-off wavelength (μm). $MFD_{1.31}$ is a mode field diameter (μm) at a wavelength of 1.31 μm. MAC represents a ratio value represented by $MFD_{1.31}/\lambda cc$. The bending loss represents a bending loss (dB/10 turns) at a bending radius of 15 mm and a wavelength of 1.55 μm.

The optical fibers in Examples 1 to 9 had characteristics which comply with ITU-T Recommendation G.652.D. In this standard, it is determined that $MFD_{1.31}$ is 8.6-9.5 μm, the cladding diameter is 125.0±1 μm, the core eccentricity is 0.6 μm or less, the non-circularity of the cladding is 1.0% or less, the cable cut-off wavelength is 1260 nm or less, the macro bend loss (at a wavelength of 1625 nm, radius of 30 mm, and 100 turns) is 0.1 dB or less, the zero-dispersion wavelength λα is 1300 nm or more and 1324 nm or less, the zero-dispersion slope coefficient So is 0.092 ps/nm²×km or less.

Based on the definition formula of A, the value A (%·μm) was determined. The relationship between the value A and the bending loss (at the wavelength of 1.55 μm, the radius of 15 mm, and 10 turns) in Examples of 1-9 is shown in the graph of FIG. 1. It has been found that as smaller the value A becomes, the smaller the value of the bending loss tends to be. In Table 1, Examples 1 to 6 and 9 correspond to A≤0.3%·μm.

The broken line in FIG. 1 shows a value of bending loss determined for the optical fiber having the refractive index profile of the α-th power (α=3). In the optical fiber having the refractive index profile of the α-th power (α=3), the bending loss was 0.034 dB/10 turn, the mode field diameter $MFD_{1.31}$ was 9.2 μm, and the cable cut-off wavelength Δcc was 1.20 μm. Based on these results, it has been found that by setting the value A to be 0.3%·μm or less, an optical fiber having lower bending loss compared to the bending loss of an optical fiber having the refractive index profile of the α-th power (α=3) can be obtained.

Second Embodiment

In the embodiment described above, the configuration such that the optical fiber 5 includes the core 1 and the cladding 4 is described; however, the cladding 4 may include the following configuration.

Figure 16:
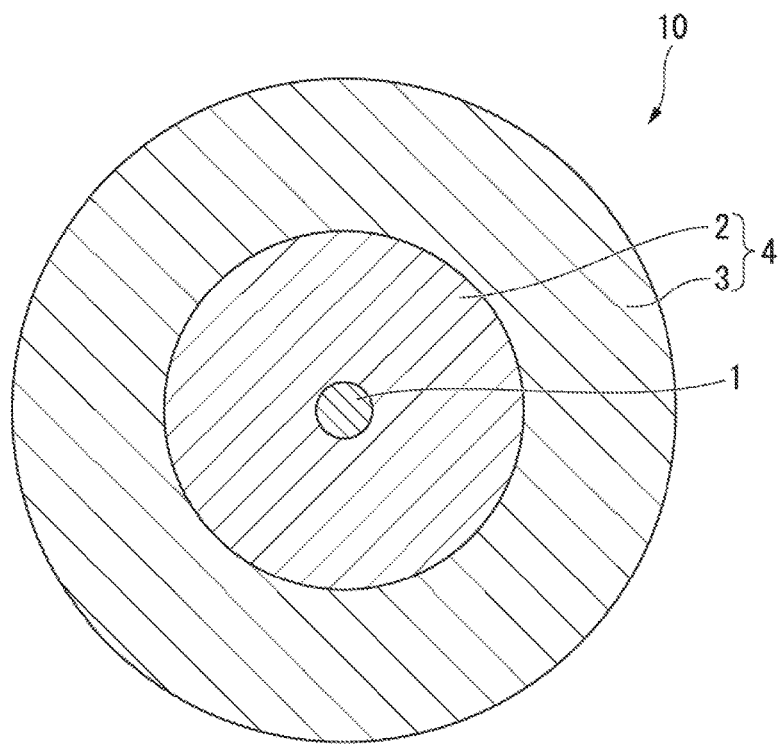
FIG. 16 is a cross-sectional view schematically showing an optical fiber according to the second embodiment of the present invention.

FIG. 16 shows schematic configuration of an optical fiber 10 according to a second embodiment of the present invention.

The optical fiber 10 includes a core 1 disposed on the center portion, and a cladding 4 disposed on the outer circumference side (the outer circumference) of the core 1 to be concentric with the core 1.

The cladding 4 includes at least an inner cladding layer 2 adjacent to the outer circumference side of the core 1 and an outer cladding layer 3 formed on the outer circumference side of the inner cladding layer 2.

Figure 17:
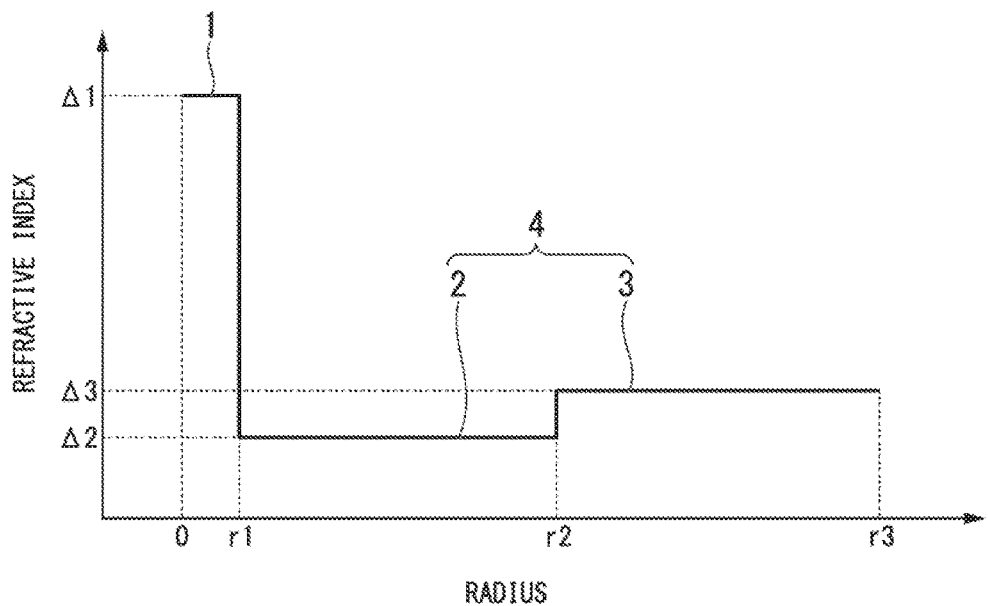
FIG. 17 is a drawing schematically showing a refractive index profile of the optical fiber shown in FIG. 16.

FIG. 17 schematically shows a refractive index profile of the optical fiber 10.

The refractive index of the core 1 is defined as Δ1, and the maximum refractive index of the core 1 is defined as Δ1max.

The refractive index of the inner cladding layer 2 is defined as Δ2, and the minimum refractive index of the inner cladding layer 2 is defined as Δ2min.

The refractive index of the outer cladding layer 3 is defined as Δ3.

The maximum refractive index Δ1max of the core 1 is the refractive index of the core 1 which is maximized in a diameter direction range from the center of the core 1 to the outer circumference of the core 1. In the refractive index profile shown in FIG. 17, the refractive index Δ1 of the core 1 is constant without depending on the position in the diameter direction, and thus, the refractive index Δ1 is identical to the maximum refractive index Δ1max in the entire range.

The minimum refractive index Δ2min of the inner cladding layer 2 is the refractive index of the inner cladding layer 2 which is minimized in a diameter direction range from the inner circumference of the inner cladding layer 2 to the outer circumference of the inner cladding layer 2. In the refractive index profile shown in FIG. 17, the refractive index Δ2 of the inner cladding layer 2 is constant without depending on the position in the diameter direction, and thus, the refractive index Δ2 is identical to the minimum refractive index Δ2min in the entire range.

In the optical fiber 10, the following formula (11) is satisfied.

$$\Delta 1max > \Delta 2min \text{ and } \Delta 1max > \Delta 3 \quad (11)$$

As shown in Formula (11), the maximum refractive index Δ1max of the core 1 is greater than the minimum refractive index Δ2min of the inner cladding layer 2 and the refractive index Δ3 of the outer cladding layer 3.

In addition, in the optical fiber 10, the minimum refractive index Δ2min of the inner cladding layer 2 is less than the refractive index Δ3 of the outer cladding layer 3.

In the optical fiber 10, the following Formula (12) is further satisfied.

$$0.01\% < |\Delta 2min - \Delta 3| < 0.03\% \quad (12)$$

Formula (12) indicates that the absolute value of a difference between the minimum refractive index Δ2min of the inner cladding layer 2 and the refractive index Δ3 of the outer cladding layer 3 is greater than 0.01% and less than 0.03%.

When the absolute value of the difference between Δ2min and Δ3 is excessively small, the bending loss may not be sufficiently reduced. In contrast, when the absolute value of the difference between Δ2min and Δ3 is excessively large, the mode field diameter decreases, and a connection loss at the time of being connected to the other optical fiber (for example, a general single mode optical fiber (SSMF)) may increase.

In the optical fiber 10, it is possible to reduce the bending loss by setting the absolute value of the difference between $\Delta 2min$ and $\Delta 3$ to be greater than 0.01%. In addition, it is possible to optimize the mode field diameter (MFD) and to suppress the connection loss to be low at the time of being connected to the other optical fiber by setting the absolute value of the difference between $\Delta 2\ min$ and $\Delta 3$ to be less than 0.03%.

In the optical fiber 10 of the first embodiment, Formula (11A) described below is satisfied with respect to a magnitude relationship of $\Delta 1max$, $\Delta 2min$, and $\Delta 3$.

$$\Delta 1max > \Delta 3 > \Delta 2min \qquad (11A)$$

As shown in Formula (11A), the maximum refractive index $\Delta 1max$ of the core 1 is greater than the refractive index $\Delta 3$ of the outer cladding layer 3.

The refractive index $\Delta 3$ of the outer cladding layer 3 is greater than the minimum refractive index $\Delta 2min$ of the inner cladding layer 2.

$\Delta 3$ is greater than $\Delta 2min$, and thus, Formula (12) described above is able to be described as follows.

$$0.01\% < (\Delta 3 - \Delta 2min) < 0.03\% \qquad (12A)$$

Formula (12) indicates that a difference between the refractive index $\Delta 3$ of the outer cladding layer 3 and the minimum refractive index $\Delta 2min$ of the inner cladding layer 2 is greater than 0.01% and less than 0.03%.

The outer circumferential radii of the core 1, the inner cladding layer 2, and the outer cladding layer 3 are respectively described as r1, r2, and r3.

The outer circumference radius r1 of the core 1, the outer circumferential radius r2 of the inner cladding layer 2, and the outer circumferential radius r3 of the outer cladding layer 3 have a relationship denoted by Formula (13) described below.

$$r1 < r2 < r3 \qquad (13)$$

The ratio r1/r2 of the outer peripheral radius r2 of the inner cladding layer 2 and the outer peripheral radius r1 of the core 1 is in the range shown in the following Formula (14).

$$0.2 \leq r1/r2 \leq 0.5 \qquad (14)$$

When r1/r2 is too small, the mode field diameter is reduced, and the connection loss when connected to the other optical fiber (for example, S-SMF) may become larger. On the other hand, when r1/r2 is too large, there is a possibility that the bending loss increases.

In the optical fiber 10, the r1/r2 is 0.2 or more; thereby, optimizing the mode field diameter and the connection loss when connected to the other optical fiber can be reduced. When r1/r2 is 0.5 or less, the bending loss can be reduced.

In the optical fiber 10, the cable cutoff wavelength λcc is 1260 nm or less. In other words, the following Formula (15) is satisfied.

$$\lambda cc \leq 1260 \text{ nm} \qquad (15)$$

Accordingly, the regulation of ITU-T Recommendation G.652 is able to be satisfied.

The cut-off wavelength λcc, for example, is able to be measured by a measurement method disclosed in ITU-T Recommendation G.650.

In the optical fiber 10, the refractive index and the outer circumferential radius described above are adjusted, and thus, the mode field diameter (MFD) at a wavelength of 1310 nm is greater than or equal to 8.6 μm and less than or equal to 9.5 μm. That is, Formula (16) described below is established.

$$8.6 \text{ μm} \leq MFD \leq 9.5 \text{ μm} \qquad (16)$$

The mode field diameter is in the range of Formula (16), and thus, the connection loss at the time of being connected to the other optical fiber (for example, SSMF) is able to be suppressed to be low.

In the optical fiber 10, the mode field diameter is in the above range, and thus, the regulation of ITU-T G.652 is satisfied.

In the optical fiber 10, it is preferable that a loss increase at a wavelength of 1550 nm at the time of winding the optical fiber 10 around a cylindrical mandrel having a diameter of 15 mm 10 times be less than or equal to 0.25 dB.

In addition, it is preferable that the loss increase at a wavelength of 1625 nm at the time of winding the optical fiber 10 around the cylindrical mandrel having a diameter of 15 mm 10 times be less than or equal to 1.0 dB.

The core 1, for example, is able to be configured of silica glass of which the refractive index increases by adding a dopant such as germanium (Ge).

The inner cladding layer 2, for example, is able to be configured of silica glass of which the refractive index decreases by adding a dopant such as fluorine (F). The inner cladding layer 2, for example, may be configured of silica glass of which the refractive index increases by adding a dopant such as chlorine (Cl).

The outer cladding layer 3, for example, is able to be configured of pure silica glass. In the outer cladding layer 3, the refractive index may be adjusted by adding a dopant (for example, Ge, F, and the like).

Each layer configuring the optical fiber 10 is able to be formed by a known method such as a MCVD method, a PCVD method, a VAD method, and an OVD method, or a combination thereof.

For example, when the MCVD method is adopted, the optical fiber preform is able to be prepared as follows.

A glass deposition layer which becomes the inner cladding layer 2 is formed on the inside of a silica glass tube (for example, a glass tube formed of pure silica glass) which becomes the outer cladding layer 3, for example, by using a raw material containing a dopant such as fluorine (F). The refractive index of the inner cladding layer 2 is able to be adjusted by the added amount of the dopant.

Next, a glass deposition layer which becomes the core 1 is formed on the inside of the glass deposition layer, for example, by using a raw material containing a dopant such as germanium (Ge). Furthermore, the core 1 is able to be formed by using a core rod which is separately prepared.

The silica glass tube in which the glass deposition layer is formed becomes the optical fiber preform through a transparency step, a solidification step, and the like. The optical fiber preform is subjected to fiber drawing, and thus, the optical fiber 10 shown in FIG. 16 is able to be obtained.

The CVD method is preferable from the viewpoint of accurately adjusting the refractive index profile by adding a dopant.

The VAD method and the OVD method are also able to be applied to manufacture the optical fiber 10. The VAD method and the OVD method have advantages such as high productivity.

In the optical fiber 10, a difference in the refractive indices between the inner cladding layer 2 and the outer cladding layer 3 is in the range described above (refer to Formula (12)), and a ratio of the core 1 and the inner cladding layer 2 is in the range described above (refer to Formula (14)), and thus, the connection loss at the time of being connected to the other optical fiber is able to be suppressed to be low, and the bending loss is able to be reduced.

It has been known that the refractive index of the cladding in a portion close to the core considerably affects optical properties of the optical fiber; however, as a result of intensive studies of the present inventor, a refractive index profile has been found in which the bending loss is able to be reduced without decreasing the mode field diameter.

By adopting the refractive index profile, the optical fiber 10 has technical meaning from the viewpoint of making suppression of the connection loss at the time of being connected to the other optical fiber and a reduction in the bending loss compatible.

In the optical fiber 10, the difference in the refractive indices between the inner cladding layer 2 and the outer cladding layer 3 is small, and thus, the refractive index of the inner cladding layer 2 and the outer cladding layer 3 is able to be easily and accurately adjusted by using the manufacturing method of the related art (for example, a general manufacturing method of SSMF) without considerably changing the method.

In addition, the difference in the refractive indices between the inner cladding layer 2 and the outer cladding layer 3 is small, and thus, constraint based on the manufacturing method decreases. For example, not only the CVD method which is considered to be suitable for adjusting the refractive index profile, but also the VAD method, and the OVD method are able to be adopted.

Accordingly, the optical fiber 10 is able to be easily manufactured, and manufacturing costs are able to be made low.

In the optical fiber 10, the difference in the refractive indices between the inner cladding layer 2 and the outer cladding layer 3 is small, and thus, the added amount of the dopant such as fluorine (F) and chlorine (Cl) for forming the inner cladding layer 2 is able to be reduced.

Raw material gas (for example, $SiF_4$) used in a dope such as fluorine (F) is expensive, and thus, raw material costs are able to be suppressed and manufacturing costs are able to be made low by reducing the added amount of the dopant.

As shown in FIG. 17, in the optical fiber 10, the minimum refractive index Δ2min of the inner cladding layer 2 is less than the refractive index Δ3 of the outer cladding layer 3, and thus, it is possible to make containment of the light with respect to the core 1 excellent and to reduce the bending loss.

Third Embodiment

In an embodiment of the present invention, the optical fiber may further have the following configuration.

Figure 18:
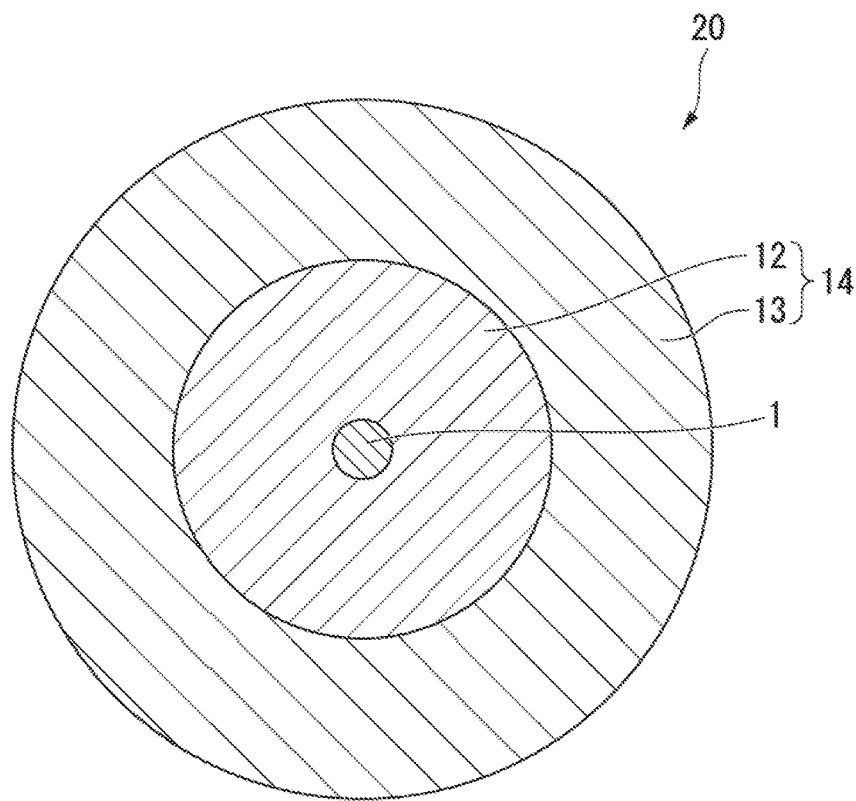
FIG. 18 is a cross-sectional view schematically showing an optical fiber according to the third embodiment of the present invention.

FIG. 18 shows schematic configuration of an optical fiber 20 according to a second embodiment of the present invention.

The optical fiber 20 includes a core 1 disposed on the center portion, and a cladding 14 disposed on the outer circumference side of the core 1 to be concentric with the core 1.

The cladding 14 includes an inner cladding layer 12 adjacent to the outer circumference side of the core 1, and an outer cladding layer 13 formed on the outer circumference side of the inner cladding layer 12.

Figure 19:
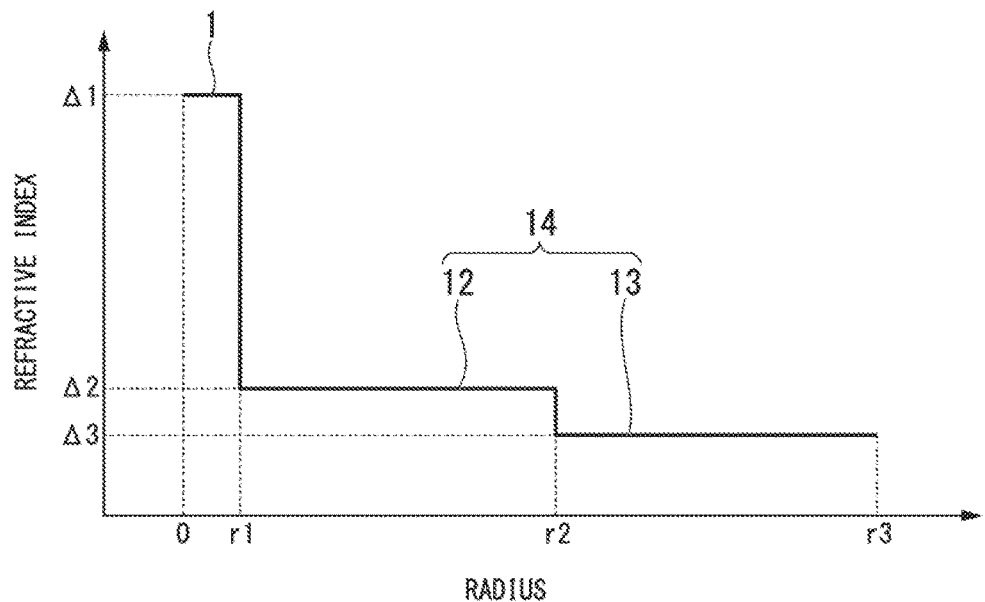
FIG. 19 is a drawing schematically showing a refractive index profile of the optical fiber shown in FIG. 18.

FIG. 19 schematically shows a refractive index profile of the optical fiber 20.

The refractive index of the core 1 is defined as Δ1, and the maximum refractive index of the core 1 is defined as Δ1max. The refractive index of the inner cladding layer 12 is defined as Δ2, and the minimum refractive index of the inner cladding layer 12 is defined as Δ2min. The refractive index of the outer cladding layer 13 is defined as Δ3.

In the optical fiber 20, Formula (17) described below is satisfied as with the optical fiber 10 of the first embodiment.

Δ1max>Δ2min and Δ1max>Δ3 (17)

The optical fiber 20 is different from the optical fiber 10 of the first embodiment in that the minimum refractive index Δ2min of the inner cladding layer 12 is adjusted to be greater than the refractive index Δ3 of the outer cladding layer 13.

In the optical fiber 20, Formula (18) described below is satisfied as with the optical fiber 10 of the first embodiment.

0.01%<|Δ2min−Δ3|<0.03% (18)

The absolute value of the difference between the Δ2min and Δ3 is adjusted to be in the range described above, and thus, the mode field diameter (MFD) is able to be optimized, the connection loss at the time of being connected to the other optical fiber is able to be suppressed to be low, and the bending loss is able to be reduced.

The outer circumference radius r1 of the core 1, the outer circumferential radius r2 of the inner cladding layer 12, and the outer circumferential radius r3 of the outer cladding layer 13 have relationships denoted by Formula (19) and Formula (20) described below, as with the optical fiber 10 of second embodiment.

r1<r2<r3 (19)

0.2≤r1/r2≤0.5 (20)

r1/r2 is adjusted to be 0.2 or more, and thus the mode field diameter is able to be optimized, the connection loss at the time of being connected to the other optical fiber is able to be suppressed to be low, and the bending loss is able to be reduced.

In the optical fiber 20, the cut-off wavelength λcc is 1260 nm or less, as with the optical fiber 10 of the second embodiment.

In addition, the mode field diameter (MFD) at a wavelength of 1310 nm is 8.6 μm or more and 9.5 μm or less.

In the optical fiber 20, it is preferable that the loss increase at a wavelength of 1550 nm at the time of winding the optical fiber 10 around a cylindrical mandrel having a diameter of 15 mm 10 times be less than or equal to 0.25 dB. In addition, it is preferable that the loss increase at a wavelength of 1625 nm at the time of winding the optical fiber 10 around the cylindrical mandrel having a diameter of 15 mm 10 times be less than or equal to 1.0 dB.

The core 1, for example, is able to be configured of silica glass of which the refractive index increases by adding a dopant such as germanium (Ge).

The inner cladding layer 12, for example, is able to be configured of pure silica glass. In the inner cladding layer 12, for example, the refractive index may be adjusted by adding a dopant such as chlorine (Cl).

The outer cladding layer 13, for example, is able to be configured of pure silica glass. The outer cladding layer 3, for example, may be configured of silica glass of which the refractive index decreases by adding a dopant such as fluorine (F).

The optical fiber 20 is able to be manufactured by such as a MCVD method, a PCVD method, a VAD method, and an OVD method as with the optical fiber 10 of the first embodiment. For example, when the MCVD method is adopted, the optical fiber preform is able to be prepared as follows.

A glass deposition layer which becomes the inner cladding layer 12 is formed on the inside of a silica glass tube (for example, a silica glass tube containing a dopant such as fluorine (F)) which becomes the outer cladding layer 13 by using a raw material such as pure silica glass.

Next, a glass deposition layer which becomes the core 1 is formed on the inside of the glass deposition layer, for example, by using a raw material containing a dopant such as germanium (Ge). Furthermore, the core 1 is able to be formed by using a core rod which is separately prepared.

The silica glass tube in which the glass deposition layer is formed becomes the optical fiber preform through a transparency step, a solidification step, and the like. The optical fiber preform is subjected to fiber drawing, and thus, the optical fiber 20 shown in FIG. 18 is able to be obtained.

In the optical fiber 20, a difference in the refractive indices between the inner cladding layer 12 and the outer cladding layer 13 is in the range described above, and a ratio of the core 1 and the inner cladding layer 12 is in the range described above, and thus, the connection loss at the time of being connected to the other optical fiber is able to be suppressed to be low, and the bending loss is able to be reduced.

In the optical fiber 20, the manufacturing method of the related art is able to be used without being considerably changed, and thus, the optical fiber 20 is able to be easily manufactured, and the manufacturing costs are able to be made low.

As described above, the preferred embodiment of the present invention has been described; however, the embodiment is an example of the present invention, and addition, omission, substitution, and other changes are able to be performed without departing from the scope of the present invention.

For example, in the optical fibers 10 and 20 shown in FIG. 17 and FIG. 19, the claddings 4 and 14 are formed of two cladding layers (the inner cladding layer and the outer cladding layer), and the cladding may include layers other than the inner cladding layer and the outer cladding layer.

Fourth Embodiment

In an embodiment of the present invention, the optical fiber may further have the following configuration.

Figure 20:
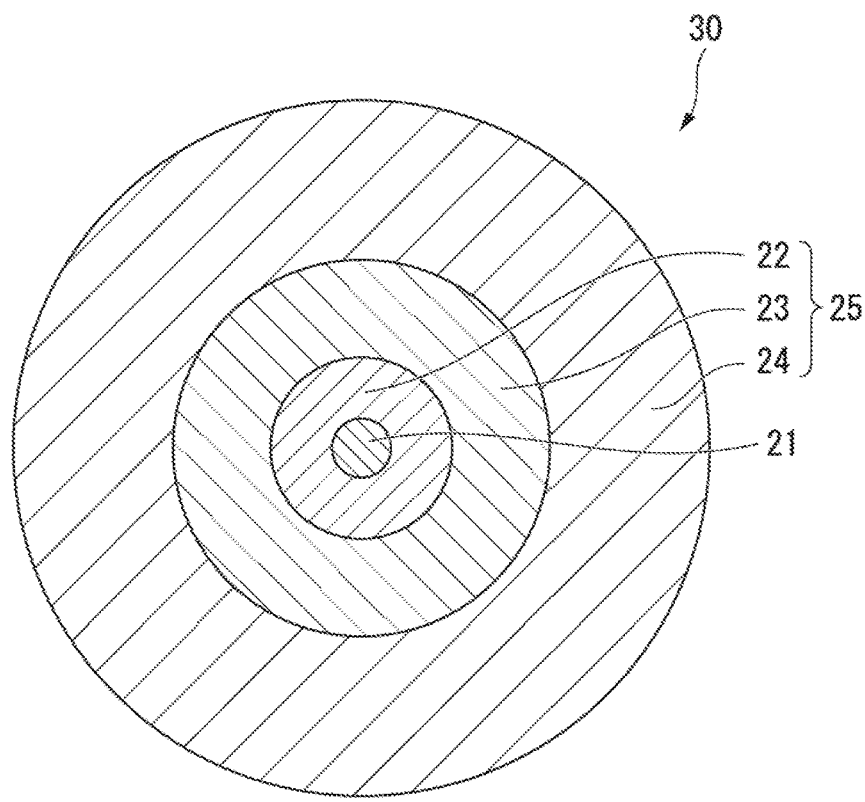
FIG. 20 is a cross-sectional view schematically showing an optical fiber according to the fourth embodiment of the present invention.

FIG. 20 shows a schematic configuration of an optical fiber 30 according to a fourth embodiment of the present invention.

The optical fiber 30 includes a core 21 disposed on the center portion, and a cladding 25 disposed on the outer circumference side of the core 21 to be concentric with the core 21.

The cladding 25 includes an inner cladding layer 22 adjacent to the outer circumference side of the core 21, a trench 23 formed to be adjacent to the outer circumference side of the inner cladding layer 22, and an outer cladding layer 24 formed on the outer circumference side of the trench 23.

Figure 21:
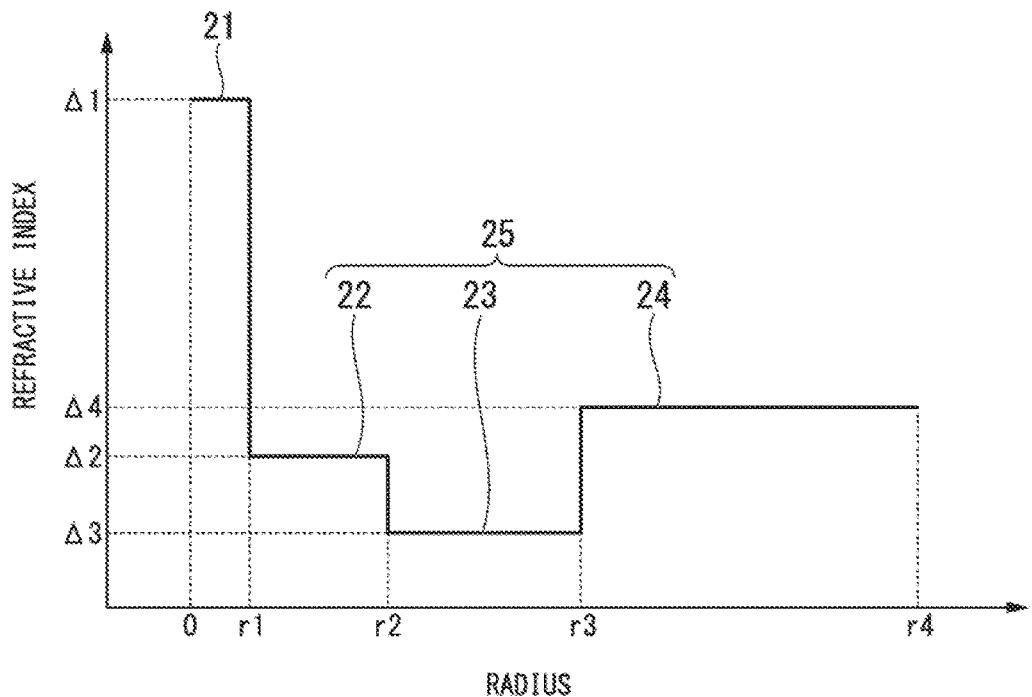
FIG. 21 is a drawing schematically showing a refractive index profile of the optical fiber shown in FIG. 20.

FIG. 21 schematically shows a refractive index profile of the optical fiber 30.

The refractive index of the core 21 is defined as $\Delta 1$, and the maximum refractive index of the core 21 is defined as $\Delta 1 max$.

The refractive index of the inner cladding layer 22 is defined as $\Delta 2$, and the minimum refractive index of the inner cladding layer 22 is defined as $\Delta 2 min$.

The refractive index of the trench 23 is defined as $\Delta 3$, and the minimum refractive index of the trench 23 is defined as $\Delta 3 min$.

The refractive index of the outer cladding layer 24 is defined as $\Delta 4$.

The maximum refractive index $\Delta 1 max$ of the core 21 is the refractive index of the core 21 which is maximized in a diameter direction range from the center of the core 21 to the outer circumference of the core 21. In the refractive index profile shown in FIG. 21, the refractive index $\Delta 1$ of the core 21 is constant without depending on the position of the diameter direction, and thus, the refractive index $\Delta 1$ is identical to the maximum refractive index $\Delta 1 max$ in the entire range.

The minimum refractive index $\Delta 2 min$ of the inner cladding layer 22 is the refractive index of the inner cladding layer 22 which is minimized in a diameter direction range from the inner circumference of the inner cladding layer 22 to the outer circumference of the inner cladding layer 22. In the refractive index profile shown in FIG. 21, the refractive index $\Delta 2$ of the inner cladding layer 22 is constant without depending on the position of the diameter direction, and thus, the refractive index $\Delta 2$ is identical to the minimum refractive index $\Delta 2 min$ in the entire range.

The minimum refractive index $\Delta 3 min$ of the trench 23 is the refractive index of the trench 23 which is minimized in a diameter direction range from the inner circumference of the trench 23 to the outer circumference of the trench 23. In the refractive index profile shown in FIG. 21, the refractive index $\Delta 3$ of the trench 23 is constant without depending on the position of the diameter direction, and thus, the refractive index $\Delta 3$ is identical to the minimum refractive index $\Delta 3 min$ in the entire range.

In the optical fiber 30, Formula (21) described below is satisfied.

$$\Delta 1 max > \Delta 2 > \Delta 3 min \quad (21)$$

As shown in Formula (21), the maximum refractive index $\Delta 1 max$ of the core 21 is greater than the refractive index $\Delta 2$ of the inner cladding layer 22.

The refractive index $\Delta 2$ of the inner cladding layer 22 is greater than $\Delta 3 min$ of the trench 23.

In the optical fiber 30, Formula (22) described below is further satisfied.

$$\Delta 1 max > \Delta 4 > \Delta 3 min \quad (22)$$

As shown in Formula (22), the maximum refractive index $\Delta 1 max$ of the core 21 is greater than the refractive index $\Delta 4$ of the outer cladding layer 24.

The refractive index $\Delta 4$ of the outer cladding layer 24 is greater than $\Delta 3 min$ of the trench 23.

In the optical fiber 30, Formula (23) described below is further established.

$$0.01\% < (\Delta 4 - \Delta 3 min) < 0.03\% \quad (23)$$

Formula (23) indicates that a difference between the refractive index $\Delta 4$ of the outer cladding layer 24 and the minimum refractive index $\Delta 3 min$ of the trench 23 is greater than 0.01% and less than 0.03%.

When the difference between $\Delta 4$ and $\Delta 3 min$ is excessively small, the bending loss may not be sufficiently reduced. In contrast, the difference between $\Delta 4$ and $\Delta 3 min$ is excessively large, the mode field diameter decreases, and the connection loss at the time of being connected to the other optical fiber (for example, a general single mode optical fiber (SSMF)) may increase.

In the optical fiber 30, the difference between Δ4 and Δ3min is in a range of greater than 0.01%, and thus, the bending loss is able to be reduced. In addition, the difference between Δ4 and Δ3min is less than 0.03%, and thus, the mode field diameter (MFD) is able to be optimized, and the connection loss at the time of being connected to the other optical fiber is able to be suppressed to be low.

The outer circumferential radii of the core 21, the inner cladding layer 22, the trench 23, and the outer cladding layer 24 are respectively r1, r2, r3, and r4.

The outer circumference radius r1 of the core 21, the outer circumferential radius r2 of the inner cladding layer 22, the outer circumferential radius r3 of the trench 23, and the outer circumferential radius r4 of the outer cladding layer 24 have a relationship denoted by Formula (24) described below.

$$r1 \leq r2 < r3 < r4 \quad (24)$$

A ratio r2/r1 of the outer circumferential radius r2 of the inner cladding layer 22 to the outer circumference radius r1 of the core 21 is in a range denoted by Formula (25) described below.

$$1 \leq r2/r1 \leq 5 \quad (25)$$

When r2/r1 is excessively small, the bending loss may increase. In contrast, when r2/r1 is excessively large, the mode field diameter decreases, and the connection loss at the time of being connected to the other optical fiber (for example, SSMF) may increase.

In the optical fiber 30, r2/r1 is greater than or equal to 1, and thus, it is possible to reduce the bending loss. r2/r1 is less than or equal to 5, the mode field diameter is able to be optimized, and the connection loss at the time of being connected to the other optical fiber is able to be suppressed to be low.

A ratio r3/r2 of the outer circumferential radius r3 of the trench 23 to the outer circumferential radius r2 of the inner cladding layer 22 is in a range denoted by Formula (26) described below.

$$1 < r3/r2 \leq 2 \quad (26)$$

When r3/r2 is excessively small, the bending loss may increase. In contrast, when r3/r2 is excessively large, the mode field diameter decreases, and the connection loss at the time of being connected to the other optical fiber (for example, SSMF) may increase.

In the optical fiber 30, r3/r2 is greater than 1, and thus, it is possible to reduce the bending loss. r3/r2 is less than or equal to 2, and thus, the mode field diameter is able to be optimized, and the connection loss at the time of being connected to the other optical fiber is able to be suppressed to be low.

In the optical fiber 30, the cut-off wavelength λcc is less than or equal to 1260 nm.

That is, Formula (27) described below is satisfied.

$$\lambda cc \leq 1260 \text{ nm} \quad (27)$$

Accordingly, the regulation of ITU-T Recommendation G.652 is able to be satisfied.

The cut-off wavelength λcc, for example, is able to be measured by a measurement method disclosed in ITU-T Recommendation G.650.

In the optical fiber 30, the refractive index and the outer circumferential radius described above are adjusted, and thus the mode field diameter (MFD) at a wavelength of 1310 nm is greater than or equal to 8.6 μm and less than or equal to 9.5 μm. That is, Formula (28) described below is established.

$$8.6 \text{ μm} \leq MFD \leq 9.5 \text{ μm} \quad (28)$$

The mode field diameter is in the range of Formula (28), and thus, the connection loss at the time of being connected to the other optical fiber (for example, SSMF) is able to be suppressed to be low.

In the optical fiber 30, the mode field diameter is in the range of Formula (28), and thus, the regulation of ITU-T G.652 is satisfied.

In the optical fiber 30, it is preferable that the loss increase at a wavelength of 1550 nm at the time of winding the optical fiber 30 around a cylindrical mandrel having a diameter of 15 mm 10 times be less than or equal to 0.25 dB.

In addition, it is preferable that the loss increase at a wavelength of 1625 nm at the time of winding the optical fiber 30 around the cylindrical mandrel having a diameter of 15 mm 10 times be less than or equal to 1.0 dB.

The core 21, for example, is able to be configured of silica glass of which the refractive index increases by adding a dopant such as germanium (Ge).

The inner cladding layer 22 and the trench 23, for example, are able to be configured of silica glass of which the refractive index decreases by adding a dopant such as fluorine (F).

The outer cladding layer 24, for example, is able to be configured of pure silica glass. In the outer cladding layer 24, the refractive index may be adjusted by adding a dopant (for example, Ge, F, and the like).

Each layer configuring the optical fiber 30 is able to be formed by a known method such as a MCVD method, a PCVD method, a VAD method, and an OVD method, or a combination thereof.

For example, when the MCVD method is adopted, the optical fiber preform is able to be prepared as follows.

A glass deposition layer which becomes the trench 23 is formed on the inside of the silica glass tube (for example, a glass tube formed of pure silica glass) which becomes the outer cladding layer 24, for example, by using a raw material containing a dopant such as fluorine (F).

A glass deposition layer which becomes the inner cladding layer 22 is formed on the inside of the glass deposition layer, for example, by using a raw material containing a dopant such as fluorine (F).

The refractive index of the trench 23 and the inner cladding layer 22 is able to be adjusted by the added amount of the dopant.

Next, a glass deposition layer which becomes the core 21 is formed on the inside of the glass deposition layer, for example, by using a raw material containing a dopant such as germanium (Ge). Furthermore, the core 21 is able to be formed by using a core rod which is separately prepared.

The silica glass tube in which the glass deposition layer is formed becomes the optical fiber preform through a transparency step, a solidification step, and the like. The optical fiber preform is subjected to fiber drawing, and thus, the optical fiber 30 shown in FIG. 20 is able to be obtained.

The CVD method is preferable from the viewpoint of accurately adjusting the refractive index profile by adding a dopant.

The VAD method and the OVD method are also able to be applied to manufacture the optical fiber 30. The VAD method and the OVD method have advantages such as high productivity.

In the optical fiber 30, a difference in the refractive indices between the trench 23 and the outer cladding layer 24 is in the range described above (refer to Formula (23)), and a ratio of the core 21, the inner cladding layer 22, and the trench 23 is in the range described above (refer to Formula (25)-Formula (27)), and thus, the connection loss at the time of being connected to the other optical fiber is able to be suppressed to be low, and the bending loss is able to be reduced.

It has been known that the refractive index of the cladding in a portion close to the core considerably affects optical properties of the optical fiber; however, as a result of intensive studies of the present inventor, a refractive index profile has been found in which the bending loss is able to be reduced without decreasing the mode field diameter.

By adopting the refractive index profile, the optical fiber 30 has technical meaning from the viewpoint of making suppression of the connection loss at the time of being connected to the other optical fiber and a reduction in the bending loss compatible.

In the optical fiber 30, the difference in the refractive indices between the trench 23 and the outer cladding layer 24 is small, and thus, the refractive index of the trench 23 and the outer cladding layer 24 is able to be easily and accurately adjusted by using the manufacturing method of the related art (for example, a general manufacturing method of SSMF) without considerably changing the method.

In addition, the difference in the refractive indices between the trench 23 and the outer cladding layer 24 is small, and thus, constraint based on the manufacturing method decreases. For example, not only the CVD method which is considered to be suitable for adjusting the refractive index profile, but also the VAD method, and the OVD method are able to be adopted.

Accordingly, the optical fiber 30 is able to be easily manufactured, and manufacturing costs are able to be made low.

In the optical fiber 30, the difference in the refractive indices between the trench 23 and the outer cladding layer 24 is small, and thus, the added amount of the dopant such as fluorine (F) for forming the trench 23 is able to be reduced.

Raw material gas (for example, $SiF_4$) used in a dope such as fluorine (F) is expensive, and thus, raw material costs are able to be suppressed and manufacturing costs are able to be made low by reducing the added amount of the dopant.

As described above, the outer circumference radii r1 to r4 of the core 21, the inner cladding layer 22, the trench 23, and the outer cladding layer 24 have a relationship denoted by Formula (24).

$$r1 \leq r2 < r3 < r4 \quad (24)$$

In the optical fiber 30 shown in FIGS. 20 and 21, r1, r2, and r3 are values different from each other; however, the present invention includes a case of r1=r2 and r2≠r3.

Figure 22:
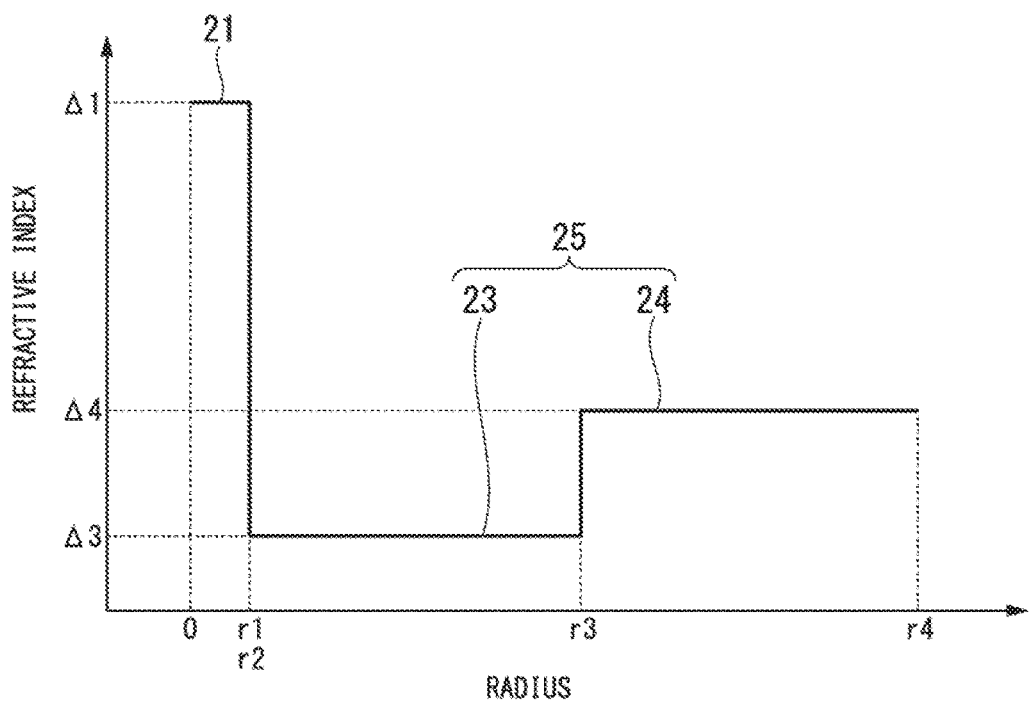
FIG. 22 is a drawing schematically showing a refractive index profile of the optical fiber according to another embodiment.

FIG. 22 is a diagram of a refractive index profile of an optical fiber of another embodiment of the present invention, and shows a case of r1=r2 and r2≠r3.

In the optical fiber, r1 is identical to r2, and thus, the cladding 25 is formed only of the trench 23 and the outer cladding layer 24 formed on the outer circumference side of the trench 23.

As described above, the preferred embodiment of the present invention has been described; however, the embodiment is an example of the present invention, and addition, omission, substitution, and other changes are able to be performed without departing from the scope of the present invention.

For example, in the optical fiber 30 shown in FIG. 20, the cladding 25 is formed of three layers (the inner cladding layer, the trench, and the outer cladding layer); however, the cladding may include other layers.

DESCRIPTION OF THE REFERENCE SYMBOLS 1,5,21: core
2,12,22: the inner cladding layer
3,13,24: external cladding layer
4, 14: clad
23: trench section
10, 20, 30: optical fiber
Δ: the relative refractive index difference

The invention claimed is:

1. An optical fiber comprising a core and a cladding surrounding an outer periphery of the core, the cladding comprising an inner cladding layer adjacent to the outer periphery of the core and an outer cladding layer formed on an outer periphery of the inner cladding layer, and having a refractive index profile in which a relative refractive index difference with respect to a distance r from a center of the core is represented by $\Delta(r)$, wherein:

a value A represented by $$A = -\int_0^{0.22MFD_{1.31}} (\Delta(r) - \Delta_{ref}(r))dr + \int_{0.22MFD_{1.31}}^{0.44MFD_{1.31}} (\Delta(r) - \Delta_{ref}(r))dr$$

is 0.3%·µm or less, where a unit of r is µm, a unit of a relative refractive index difference $\Delta(r)$ is %, $\Delta_{ref}(r) = -0.064r + 0.494$, and $MFD_{1.31}$ is a mode field diameter at a wavelength of 1.31 µm;

when a minimum refractive index of the inner cladding layer is Δ2 min and a refractive index of the outer cladding layer is Δ3, the minimum refractive index of the inner cladding layer Δ2 min and the refractive index of the outer cladding layer Δ3 satisfy a relationship denoted by the following expression:

$$0.01\% < |\Delta 2 min - \Delta 3| < 0.03\%; \text{ and}$$

a ratio r1/r2 of the radius r1 of the core to a radius r2 of the inner cladding layer is in a range denoted by the following expression:

$$0.2 \leq r1/r2 \leq 0.5.$$

2. The optical fiber according to claim 1, wherein the mode field diameter at the wavelength of 1.31 µm is 8.93 µm or more and 9.4 µm or less.

3. The optical fiber according to claim 1, wherein a maximum relative refractive index difference Δmax throughout the core and a maximum relative refractive index difference Δc within a range where a distance r from a center of the core is 1 µm or less are the same.

4. The optical fiber according to claim 1, wherein a maximum relative refractive index difference Δmax throughout the core is 0.39% or more.

5. The optical fiber according to claim 1, wherein a maximum relative refractive index difference Δmax throughout the core is 0.50% or less.

6. The optical fiber according to claim 1, wherein a cable cut-off wavelength λcc is 1260 nm or less.

7. The optical fiber according to claim 1, wherein a cable cut-off wavelength λcc is 1170 nm or less.

8. The optical fiber according to claim 1, wherein a MAC value represented by a ratio $MFD_{1.31}/\lambda cc$ of a mode field diameter $MFD_{1.31}$ at a wavelength of 1.31 µm and a cable cut-off wavelength λcc is 7.38 or more and 7.7 or less.

9. A method of manufacturing the optical fiber according to claim 1 having a refractive index profile in which a relative refractive index difference with respect to a distance r from a center of the core is represented by $\Delta(r)$, the method comprising:

calculating a value A represented by $$A = -\int_0^{0.22 MFD_{1.31}} (\Delta(r) - \Delta_{ref}(r)) dr + \int_{0.22 MFD_{1.31}}^{0.44 MFD_{1.31}} (\Delta(r) - \Delta_{ref}(r)) dr$$

where a unit of r is μm, a unit of a relative refractive index difference $\Delta(r)$ is %, $\Delta_{ref}(r) = -0.064r + 0.494$, and $MFD_{1.31}$ is a mode field diameter at a wavelength of 1.31 μm; and confirming the value A is 0.3%·μm or less.

* * * * *